(12) United States Patent
Nishijima et al.

(10) Patent No.: US 8,602,615 B2
(45) Date of Patent: Dec. 10, 2013

(54) MOTORCYCLE TAIL LIGHT DEVICE

(75) Inventors: Hiroshi Nishijima, Wako (JP);
Hiroyasu Ota, Wako (JP); Hayato Ohashi, Wako (JP); Eiji Ashihara, Tokyo (JP); Atsushi Watanabe, Wako (JP); Shuto Higashizuru, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 755 days.

(21) Appl. No.: 12/870,899

(22) Filed: Aug. 30, 2010

(65) Prior Publication Data

US 2011/0051441 A1 Mar. 3, 2011

(30) Foreign Application Priority Data

Aug. 31, 2009 (JP) ................. 2009-200504
Jul. 28, 2010 (JP) ................. 2010-169521

(51) Int. Cl.
*B62J 6/00* (2006.01)
(52) U.S. Cl.
USPC .......................... 362/473; 362/540
(58) Field of Classification Search
USPC ......................... 362/540–542, 473
See application file for complete search history.

(56) References Cited

U.S. PATENT DOCUMENTS

| 7,073,618 | B1 | 7/2006 | Song | |
|---|---|---|---|---|
| 2001/0055210 | A1* | 12/2001 | Ohura | 362/473 |
| 2009/0196056 | A1* | 8/2009 | Kageyama | 362/473 |
| 2010/0195339 | A1* | 8/2010 | May | 362/473 |

FOREIGN PATENT DOCUMENTS

JP 2008-126708 6/2008

* cited by examiner

*Primary Examiner* — Anne Hines
(74) *Attorney, Agent, or Firm* — Squire Sanders (US) LLP

(57) ABSTRACT

A motorcycle tail light device can have a plurality of front engagement members, provided in a front part of a tail light support stay, that enable movement of a support position of a tail light device 50 in a vehicle longitudinal direction. A plurality of rear engagement members can be, provided in a rear part of the tail light support stay, to enable movement of the support position of the tail light device in the vehicle longitudinal direction. A front engaged member can be provided in a front part of the tail light device, engaged with any one of the plurality of front engagement members. A rear engaged member can be provided in a rear part of the tail light device, engaged with any one of the plurality of rear engagement members.

18 Claims, 39 Drawing Sheets

MOTORCYCLE TAIL LIGHT DEVICE

BACKGROUND

1. Field

This invention relates to a motorcycle tail light device.

2. Description of the Related Art

When a motorcycle is shipped to respective countries, it is often necessary to change the position of a license light and change an irradiation range in correspondence with attachment angle of a license plate which differs in accordance with regulations of various countries.

Therefore, conventionally, a motorcycle tail light device can have a tail light bulb and a license light bulb are individually provided so as to change the irradiation range of the license light, with only the license light bulb being provided movably in a vehicle longitudinal direction. Such a device is taught, for example, in Japanese patent publication JP-A 2008-126708 (JP '708). Further, in a device where one bulb is used as a tail light bulb and a license light bulb, the position of the tail light is changed by changing tail light attachment parts.

However, in the motorcycle tail light device disclosed in JP '708, since it is necessary to individually provide the tail light bulb and the license light bulb, the cost of manufacturing is increased. Further, it is necessary to increase the tail light device in size in view of adjustment moving amount of the license light bulb. Further, in the device where one bulb is used as a tail light bulb and a license light bulb, to change the position of the tail light, it is necessary to change the shape of a tail light attachment part (stay).

SUMMARY

The present invention has been made in consideration of the above situation, and has an object to provide a low-cost motorcycle tail light device in which, even though the attachment angle of the license plate differs in accordance with specification in various countries, the license plate can be securely irradiated, and it is not necessary to provide special or specific tail light attachment parts for each destination.

To attain the above object, an embodiment is a motorcycle tail light device, provided above a license plate, having a tail light bulb to irradiate the license plate. The tail light device is supported with a vehicle frame via a tail light support stay, and includes a plurality of front engagement members, provided in a front part of the tail light support stay. The plurality of front engagement members enable movement of a support position of the tail light device with respect to the license plate in a vehicle longitudinal direction. A plurality of rear engagement members are provided in a rear part of the tail light support stay, and enable movement of the support position of the tail light device with respect to the license plate in the vehicle longitudinal direction. A front engaged member is provided in a front part of the tail light device, that is engaged with any one of the plurality of front engagement members. A rear engaged member, provided in a rear part of the tail light device, is engaged with any one of the plurality of rear engagement members.

A second embodiment can be configured such that, in addition to the structure of the first embodiment, the front engagement members and the rear engagement members are one of concave members and convex members, and the front engaged member and the rear engaged member are the other one of concave members and convex members concave-convex engaged with the one of concave members and convex members.

A third embodiment can be such that, in addition to the structure of the first embodiment, the front engagement members and the rear engagement members are concave members, and the front engaged member and the rear engaged member are convex members concave-convex engaged with the concave members.

A fourth embodiment is configured such that, in addition to the structure of any one of the first to third embodiment, the front engagement members are provided in two positions in the front part of the tail light support stay, and the rear engagement members are provided in two positions shifted in the rear of the front engagement members.

A fifth embodiment is configured such that, in addition to the structure of any one of the first to fourth inventions, the front engagement members are provided in two positions in an upper part of the tail light support stay, and the rear engagement members are provided in two positions at heights shifted below the front engagement members.

A sixth embodiment is configured such that, in addition to the structure of the second or third embodiment, the convex members have pins and elastic bodies provided between the pins and the concave members.

A seventh embodiment is configured such that, in addition to the structure of the first embodiment, the tail light support stay is a pair of left and right stays, and the tail light device is held between the pair of left and right tail light support stays.

An eighth embodiment can be configured such that, in addition to the structure of the first embodiment, the tail light support stay is provided to overlap the tail light device in a top view.

A ninth embodiment can be configured such that, in addition to the structure of the first embodiment, the tail light support stay has a front stay attached to the vehicle body frame and a rear stay where the tail light device is attached. The front stay and the rear stay are integrally formed.

A tenth embodiment can be configured such that, in addition to the structure of the first embodiment, the tail light support stay has a front stay attached to the vehicle body frame and a rear stay where the tail light device is attached. The front stay and the rear stay are separately formed, and the front stay and the rear stay are mutually connected.

An eleventh embodiment can be configured such that, in addition to the structure of the first embodiment, a rear winker or turn signal is attached to the tail light support stay.

A twelfth embodiment can be configured such that, in addition to the structure of the first embodiment, the tail light support stay is formed of resin or light weight alloy.

A thirteen embodiment can be configured such that, in a motorcycle tail light device provided above a license plate, having a tail light bulb to irradiate the license plate, the tail light device can be supported with a vehicle frame via a tail light support stay or a rear fender. The device can have at least three engagement members provided in the tail light support stay or the rear fender, that enable movement of a support position of the tail light device with respect to the license plate in a vehicle longitudinal direction. Engaged members are provided in the tail light device, that are engaged with any of the at least three engagement members.

A fourteenth embodiment can be configured such that, in a motorcycle tail light device provided above a license plate, having a tail light bulb to irradiate the license plate, the tail light device is supported with a tail light support stay that is provided movably relative to a vehicle frame of the motorcycle in a vehicle longitudinal direction.

A fifteenth embodiment is configured such that, in addition to the structure of the fourteenth embodiment, the tail light support stay has a fit member fitted with the vehicle frame, and one of a fixing hole provided in the fit member and a slotted hole elongated in the vehicle longitudinal direction. The vehicle frame has the other of the fixing hole and the slotted hole elongated in the vehicle longitudinal direction. The fit member is fitted with the vehicle frame, then the fixing hole is aligned with the slotted hole, and the tail light support stay is fixed movably relative to the vehicle frame in the vehicle longitudinal direction.

A sixteenth embodiment can include a motorcycle tail light device, provided above a license plate, having a tail light bulb to irradiate the license plate. The tail light device is supported with a rear fender fixed to a vehicle frame, and can include a first front mounting member and a second front mounting member provided at a distance from each other in a vehicle longitudinal direction in a center of the rear fender in a vehicle right-left direction. A pair of rear mounting members can be provided side by side in the vehicle right-left direction in the rear fender in a position closer to the rear of the vehicle than the second front mounting member is located. A front mounted member can be provided in a front portion of the tail light device and mounted on either the first front mounting member or the second front mounting member. A pair of rear mounted members, in this embodiment, are provided in a rear portion of the tail light device and mounted to the pair of rear mounting members, and an extension stay fixed to the pair of rear mounting members for changing a coupling position of the pair of rear mounted members toward the rear of the vehicle. When the front mounted member is mounted to the second front mounting member, the pair of rear mounted members are attached to the pair of rear mounting members through the extension stay.

According to the motorcycle tail light device in the first embodiment, the tail light device is supported with a vehicle frame via a tail light support stay, and includes a plurality of front engagement members, provided in a front part of the tail light support stay, that enable movement of a support position of the tail light device with respect to the license plate in a vehicle longitudinal direction. A plurality of rear engagement members are provided in a rear part of the tail light support stay, and enable movement of the support position of the tail light device with respect to the license plate in the vehicle longitudinal direction A front engaged member, provided in a front part of the tail light device, is engaged with any one of the plurality of front engagement members. A rear engaged member, provided in a rear part of the tail light device, is engaged with any one of the plurality of rear engagement members. Accordingly, even though the attachment angle of the license plate differs in accordance with specification in each country, the license plate can be securely irradiated. Further, since the tail light support stay can also be used without any change, the cost of manufacturing can be reduced.

According to the motorcycle tail light device in the second embodiment, the front engagement members and the rear engagement members are one of concave members and convex members. The front engaged member and the rear engaged member are the other one of concave members and convex members concave-convex engaged with the one of concave members and convex members. Accordingly, it is not necessary to fasten the tail light device to the tail light support stay with screws or the like, and the tail light device can be simply and securely supported by concave-convex engagement between concave and convex members.

According to the motorcycle tail light device in the third embodiment, the front engagement members and the rear engagement members are concave members The front engaged member and the rear engaged member are convex members concave-convex engaged with the concave members. Accordingly, in comparison with a case where the tail light device is provided with concave members, a volumetric capacity of the tail light device necessary for accommodation of the tail light bulb and the reflector is not impaired.

According to the motorcycle tail light device in the fourth embodiment, the front engagement members are provided in two positions in the front part of the tail light support stay, and the rear engagement members are provided in two positions shifted in the rear of the front engagement members. Accordingly, the interval between the front engagement member and the rear engagement member can be widened, and swing of the tail light device can be suppressed.

According to the motorcycle tail light device in the fifth embodiment, the front engagement members are provided in two positions in an upper part of the tail light support stay, and the rear engagement members are provided in two positions at heights shifted below the front engagement members. Accordingly, the swing of the tail light device in a vertical direction can be suppressed.

According to the motorcycle tail light device in the sixth embodiment, the convex members have pins and elastic bodies provided between the pins and the concave members. Accordingly, transmission of swing of a vehicle body to the tail light bulb of the tail light device can be prevented.

According to the motorcycle tail light device in the seventh embodiment, the tail light support stay is a pair of left and right stays, and the tail light device is held between the pair of left and right tail light support stays. Accordingly, it is not necessary to separately prepare screws or the like for attachment of the tail light device. With this arrangement, as the number of parts can be reduced, the cost of manufacturing can be reduced.

According to the motorcycle tail light device in the eighth embodiment, the tail light support stay is provided to overlap the tail light device in a top view. Accordingly, a tail light lens of the tail light device can be protected.

According to the motorcycle tail light device in the ninth embodiment, the tail light support stay has a front stay attached to the vehicle body frame and a rear stay where the tail light device is attached, and the front stay and the rear stay are integrally formed. Accordingly, the number of parts can be reduced, and the cost of manufacturing can be reduced.

According to the motorcycle tail light device in the tenth embodiment, the tail light support stay has a front stay attached to the vehicle body frame and a rear stay where the tail light device is attached, and the front stay and the rear stay are separately formed, and the front stay and the rear stay are mutually connected. Accordingly, the materials of the front stay and the rear stay can be changed. With this arrangement, for example, the front stay can be made of metal, and the rear stay can be made of resin. Further, even regarding a vehicle model having a different vehicle body shape, the tail light device and the rear stay are also used and this arrangement can be made by only changing the front stay.

According to the motorcycle tail light device in the eleventh embodiment, a rear winker or turn signal can be attached to the tail light support stay. Accordingly, it is not necessary to separately prepare parts to attach the rear winker. With this arrangement, as the number of parts can be reduced, the cost of manufacturing can be reduced.

According to the motorcycle tail light device in the twelfth embodiment, the tail light support stay is formed of resin or light weight alloy. Accordingly, the tail light support stay can be weight-reduced.

According to the motorcycle tail light device in the thirteenth embodiment, since the tail light device has at least three engagement members provided in the tail light support stay or the rear fender and enabling movement of a support position of the tail light device with respect to the license plate in a vehicle longitudinal direction, and engaged members provided in the tail light device and engaged with any of the at least three engagement members, the tail light device can be attached in a position moved in the vehicle longitudinal direction. Also, even though the attachment angle of the license plate differs in accordance with specification in each country, the license plate can be securely irradiated.

According to the motorcycle tail light device in the fourteenth embodiment, since the tail light device is supported with a tail light support stay provided movable relative to the vehicle frame in the vehicle longitudinal direction, the tail light device can be secured in an arbitrary position in the vehicle longitudinal direction. In consequence, since it is possible to adjust a position of the tail light device to meet specifications in each country, the license plate can be illuminated with reliability.

According to the motorcycle tail light device in the fifteenth embodiment, since the tail light support stay has a fit member fitted with the vehicle frame and one of a fixing hole provided in the fit member and a slotted hole elongated in the vehicle longitudinal direction, and the vehicle frame has the other of the fixing hole and the slotted hole, and the fixing hole and the slotted hole are aligned, and then the tail light support stay is fixed movably in the vehicle longitudinal direction, the tail light device can be secured in an arbitrary position in the vehicle longitudinal direction. In consequence, since it is possible to adjust a position of the tail light device to meet specifications in each country, the license plate can be illuminated with reliability.

According to the motorcycle tail light device in the sixteenth embodiment, the rear fender has first and second front mounting members provided at a distance from each other in a vehicle longitudinal direction, and a pair of rear mounting members provided side by side in the vehicle right-left direction in a position closer to the rear of the vehicle than the second front mounting member is located. Then, the tail light device has a front mounted member provided in any of the first and second front mounting members, and a pair of rear mounted members mounted directly to or through an extension stay to the pair of rear mounting members. The front mounted member is mounted to the first front mounting member, and also the rear mounted member is mounted directly to the rear mounting member, or alternatively, the front mounted member is mounted to the second front mounting member and also the rear mounted member is mounted through the extension stay to the rear mounting member. For these reasons, the tail light device can be mounted after being moved in the vehicle longitudinal direction. In consequence, since it is possible to adjust a position of the tail light device to meet specifications in each country, the license plate can be illuminated with reliability.

DETAILED DESCRIPTION

Figure 1:
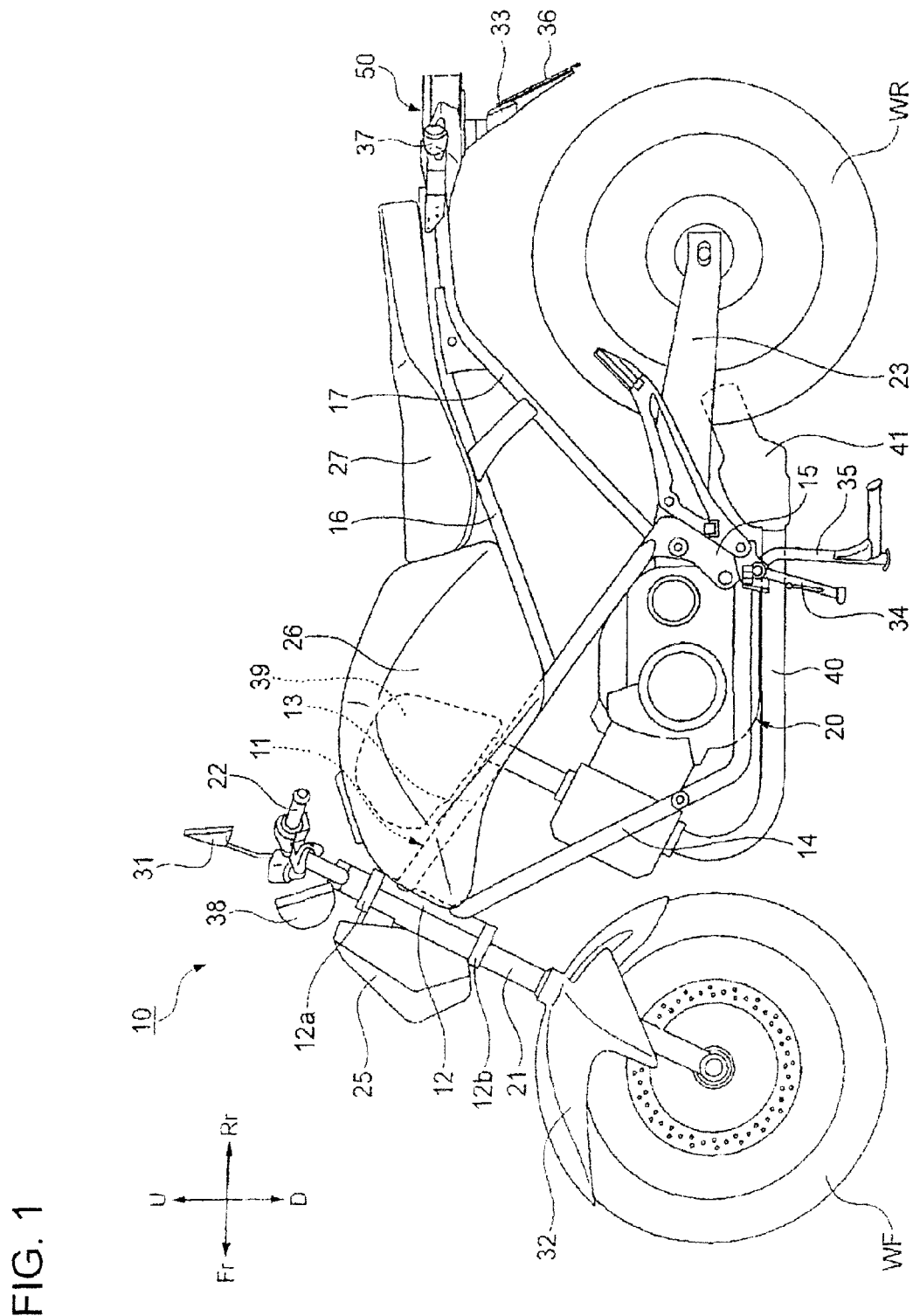
FIG. 1 is a left side view for explaining a motorcycle where an example of a tail light device according to the present invention is incorporated.

Various embodiment of a motorcycle tail light device according to the present invention will be described in detail, with reference to the drawings. Note that the drawings are viewed along the direction of reference numerals, and in the following description, front and rear positions, left and right positions, and upper and lower positions are denoted by, as the front position in the vehicle, Fr, the rear position, Rr, the left side position, L, the right side position, R, the upper position, U, and the lower position, D, in accordance with the direction viewed from a rider.

Certain embodiments of a motorcycle tail light device according to the present invention will be described with reference to FIG. 1 to FIG. 18.

As shown in FIG. 1, a motorcycle 10 in the present example is a naked type motorcycle without cowl around its head light. A vehicle body frame 11 has a head pipe 12 provided at a front end, a pair of left and right main frames 13 extended rearward and downward from the head pipe 12, and a pair of left and right down frames 14 extended downward and rearward from the head pipe 12. A pair of left and right pivot plates 15 are connected to rear ends of the pair of left and right main frames 13 and the pair of left and right down frames 14. A pair of left and right rear frames 16 can be connected to an intermediate portion of the pair of left and right main frames 13 and extended rearward, and a pair of left and right reinforcing frames 17 connected to upper ends of the pair of left and right pivot plates 15 and extended rearward. An engine 20 or other prime mover is attached to the main frames 13, the down frames 14 and the pivot plates 15.

Further, the motorcycle 10 can have a pair of left and right front forks 21 steerably supported with the head pipe 12 via an upper bridge 12a and a lower bridge 12b, a front wheel WF turnably supported with a lower end of the front forks 21, and a steering handlebar 22 attached to the upper bridge 12a at an upper end of the front forks 21. A head light device 25 is attached to the upper and lower bridges 12a and 12b via a stay (not shown) in front of and above the front forks 21, and swing arms 23 swingably supported with the pivot plates 15. A rear wheel WR can be turnably supported with rear ends of the swing arms 23, and a tail light device 50 can be attached to rear ends of the rear frames 16. A fuel tank 26 attached above the main frames 13, and a seat 27 can be attached behind the fuel tank 26 and above the rear frames 16. Note that in FIG. 1, reference numeral 31 denotes a side mirror; 32, a front fender; 33, a rear fender; 34, a side stand; 35, a main stand; 36, a license plate; 37, a rear winker; 38, a meter; 39, an air cleaner; 40, an exhaust pipe; and 41, a muffler.

As shown in FIGS. 3 to 6 and FIGS. 10 to 14, the tail light device 50 can have a tail light housing 51, a tail light lens 52 covering the entire front upper surface of the tail light housing 51 and closing the entire rear opening of the tail light housing 51. A reflector 53 is provided between the tail light housing 51 and the tail light lens 52, and a tail light bulb 54 attached to the tail light housing 51. The tail light device 50 is provided above the license plate 36, and supported with rear ends of the pair of left and right rear frames 16 via the pair of left and right tail light support stays 60.

Figure 4:
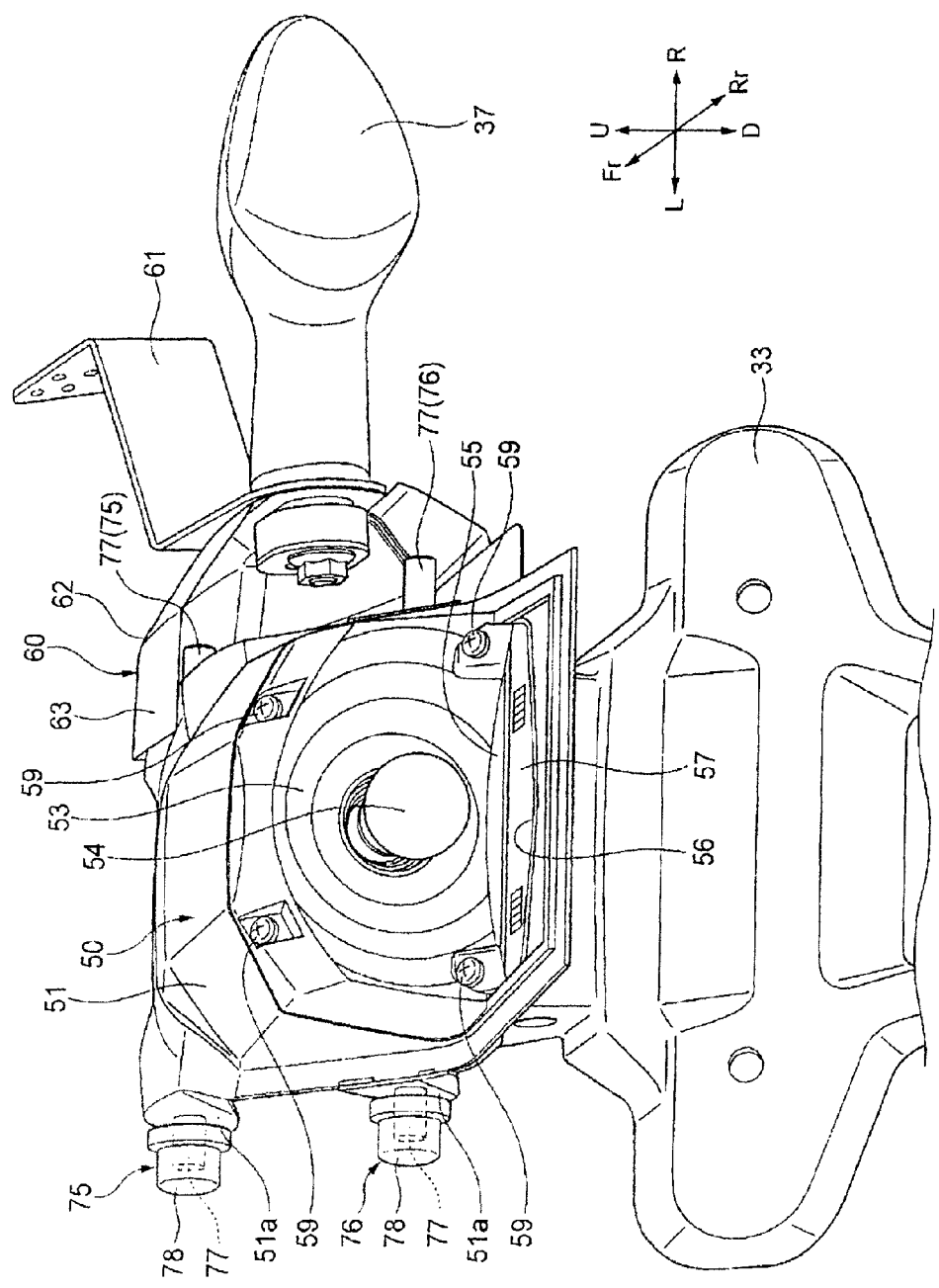
FIG. 4 is a partially-cutaway perspective view of a peripheral portion of the tail light device viewed from a rear position.
Figure 5:
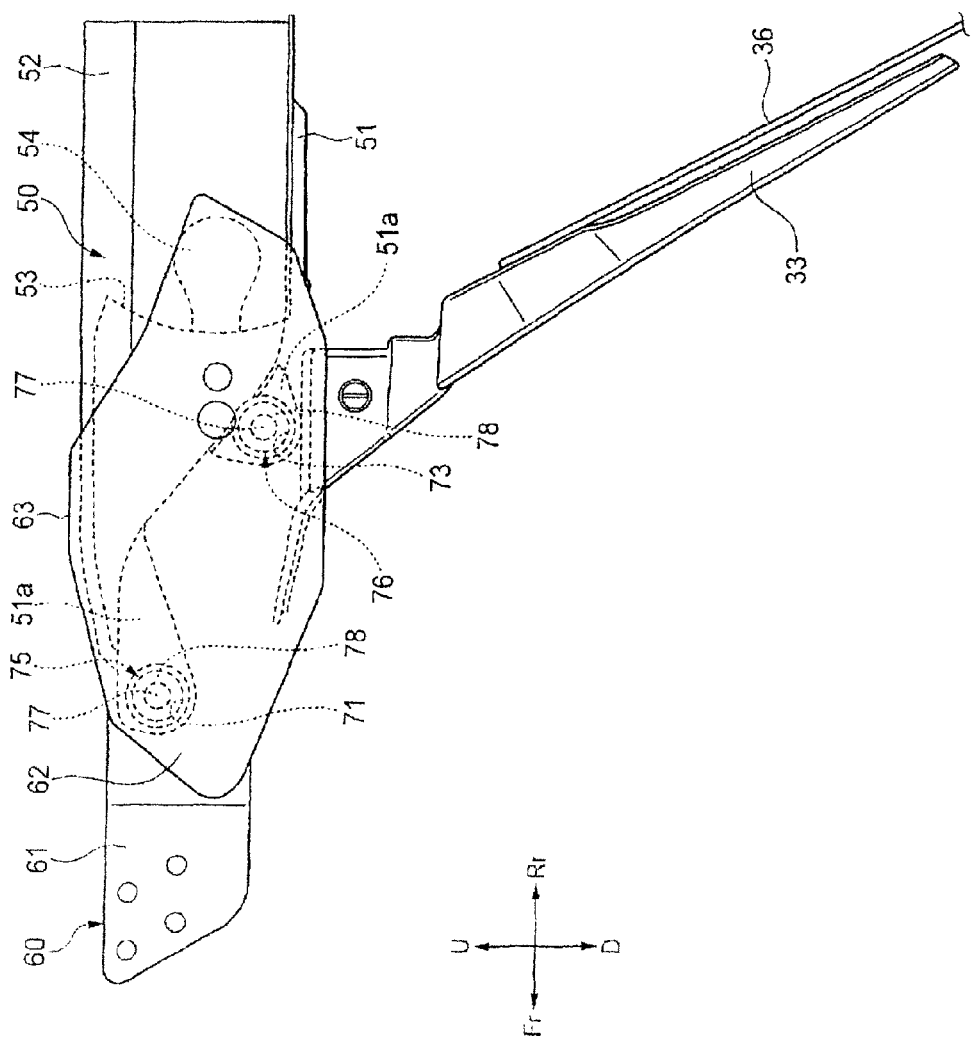
FIG. 5 is a left side view of the tail light device and the tail light support stay.
Figure 6:
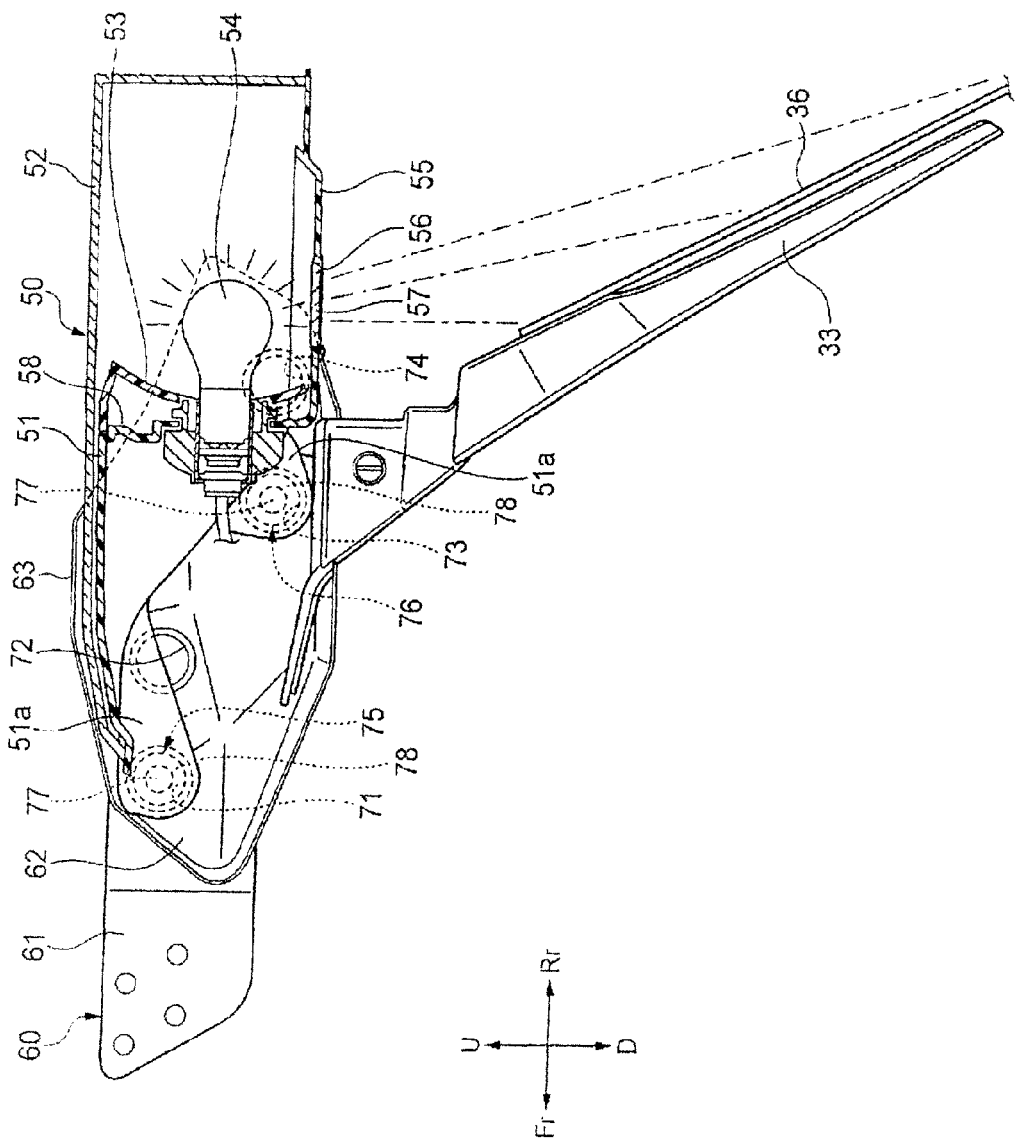
FIG. 6 is a cross-sectional view explaining a status where the tail light device is provided in a front irradiation position.

As shown in FIGS. 4 and 6, in a bottom plate 55 provided in a rear part of the tail light housing 51, a license plate irradiation opening 56 to guide bulb light of the tail light bulb 54 to the license plate 36 is provided. A license plate irradiation lens 57 is engaged with the license plate irradiation opening 56. With this arrangement, the bulb light of the tail light bulb 54 is guided downward via the license plate irradiation opening 56 and emitted to the license plate 36. Further, the rear fender 33 is supported with a lower surface of the tail light housing 51.

Figure 10:
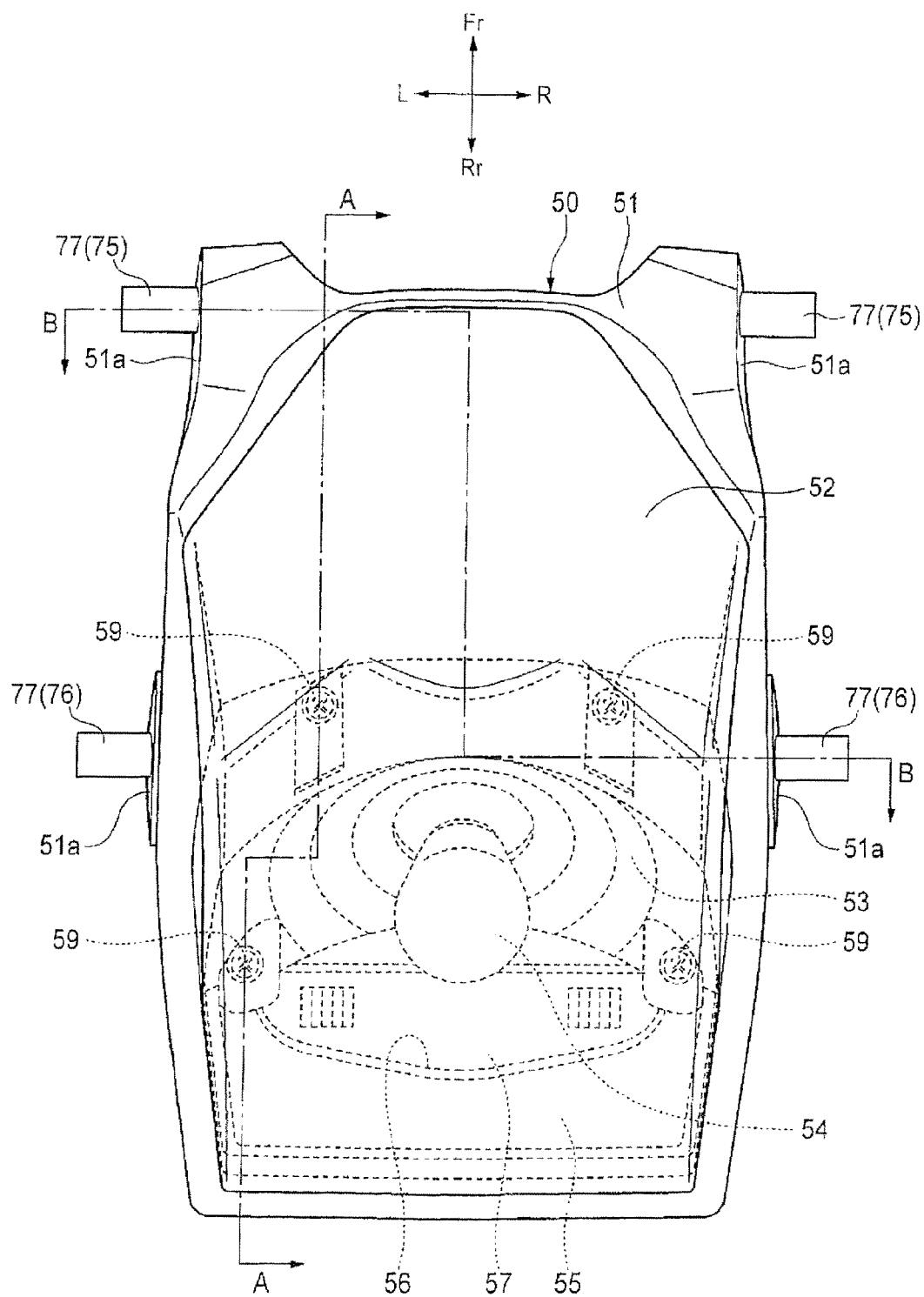
FIG. 10 is a plane view of the tail light device.
Figure 11:
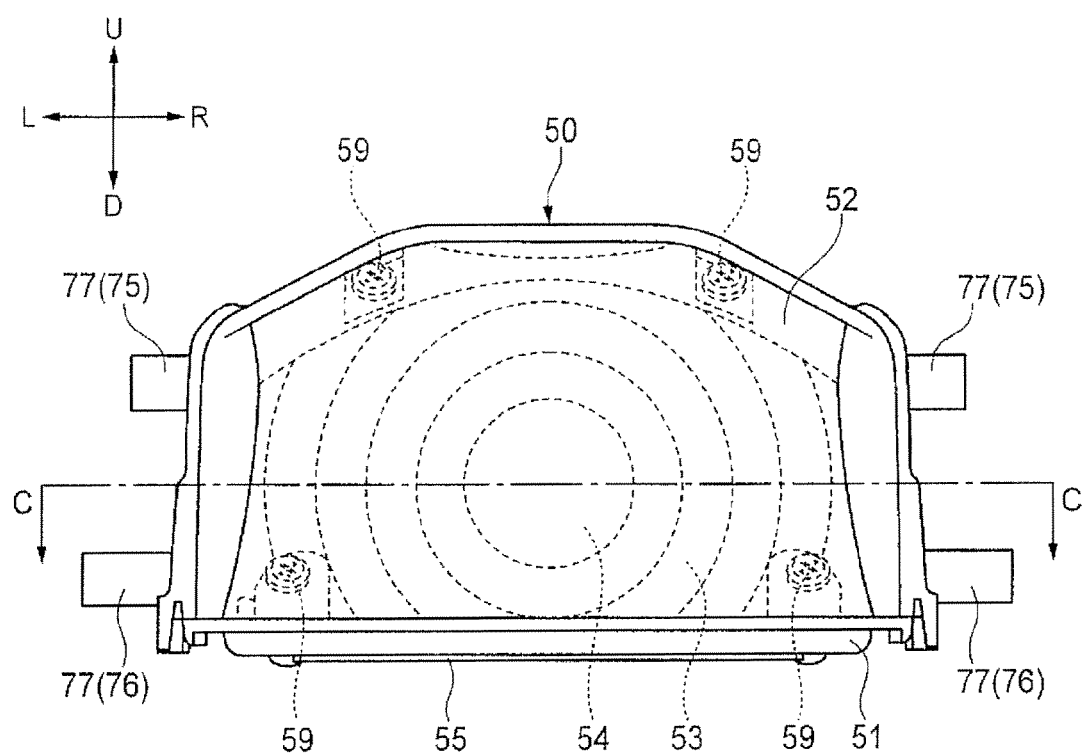
FIG. 11 is a rear view of the tail light device.
Figure 12:
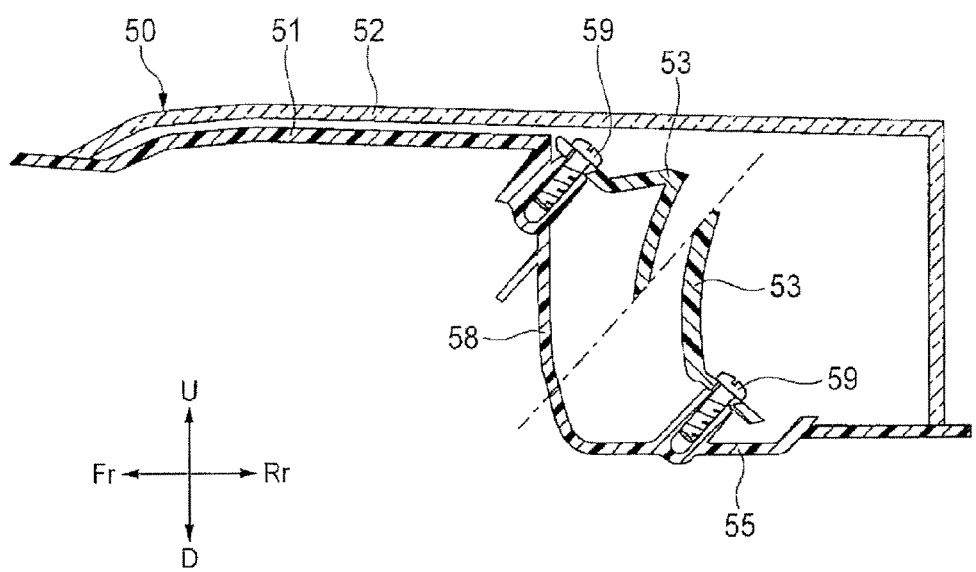
FIG. 12 is a cross-sectional view along an A-A arrow line in FIG. 10.
Figure 13:
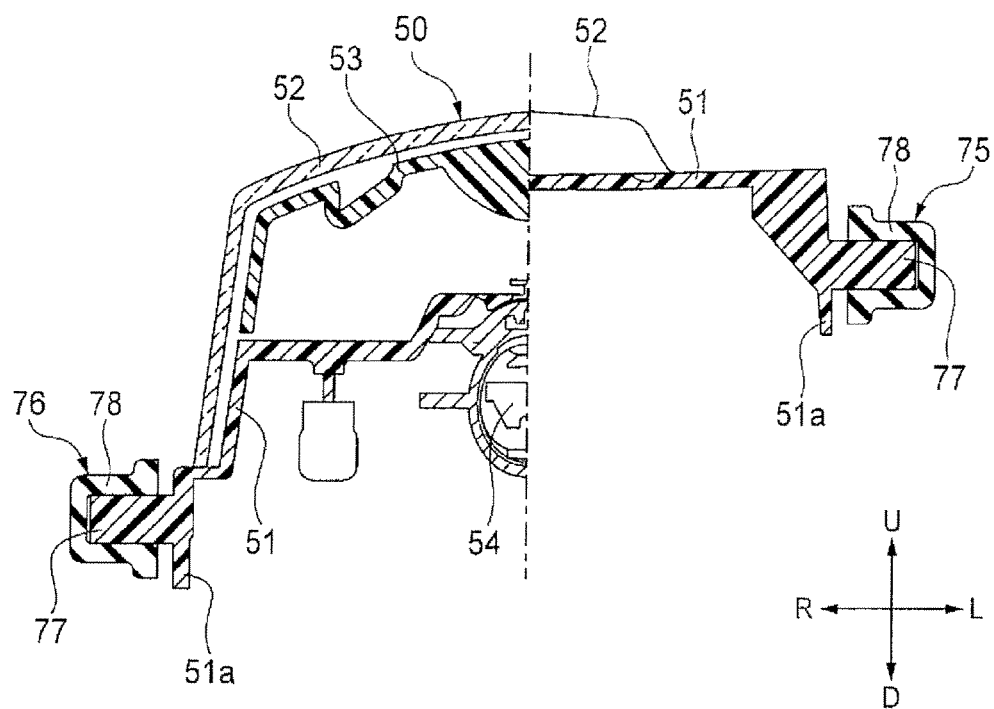
FIG. 13 is a cross-sectional view along a B-B arrow line in FIG. 10.
Figure 14:
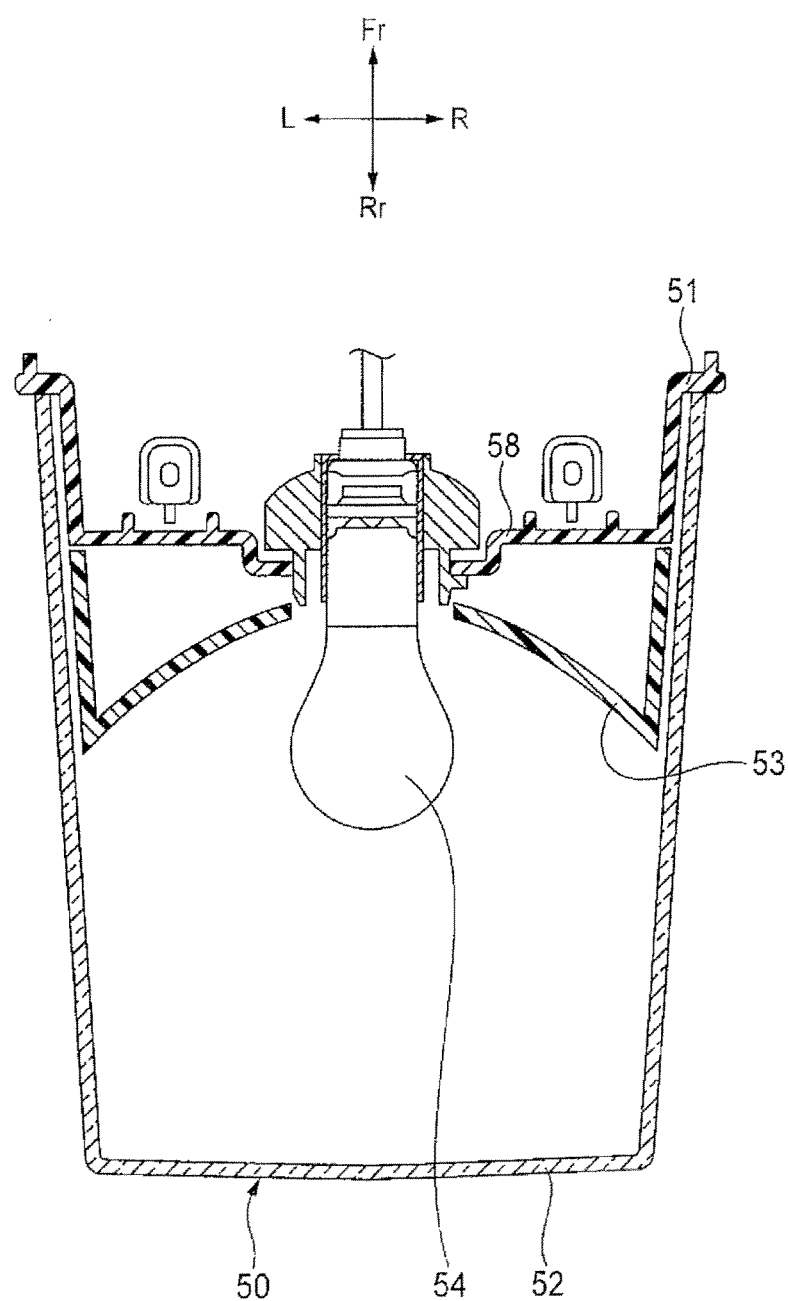
FIG. 14 is a cross-sectional view along a C-C arrow line in FIG. 11.

As shown in FIGS. 4, 10 and 12, the reflector 53 is provided in the rear of and adjacently to a wall surface 58 to which the tail light bulb 54 of the tail light housing 51 is attached, and fastened to both left and right sides of an intermediate portion of the bottom plate 55 and both left and right sides of an upper end of the wall surface 58 in the tail light housing 51 with four screws 59.

Figure 2:
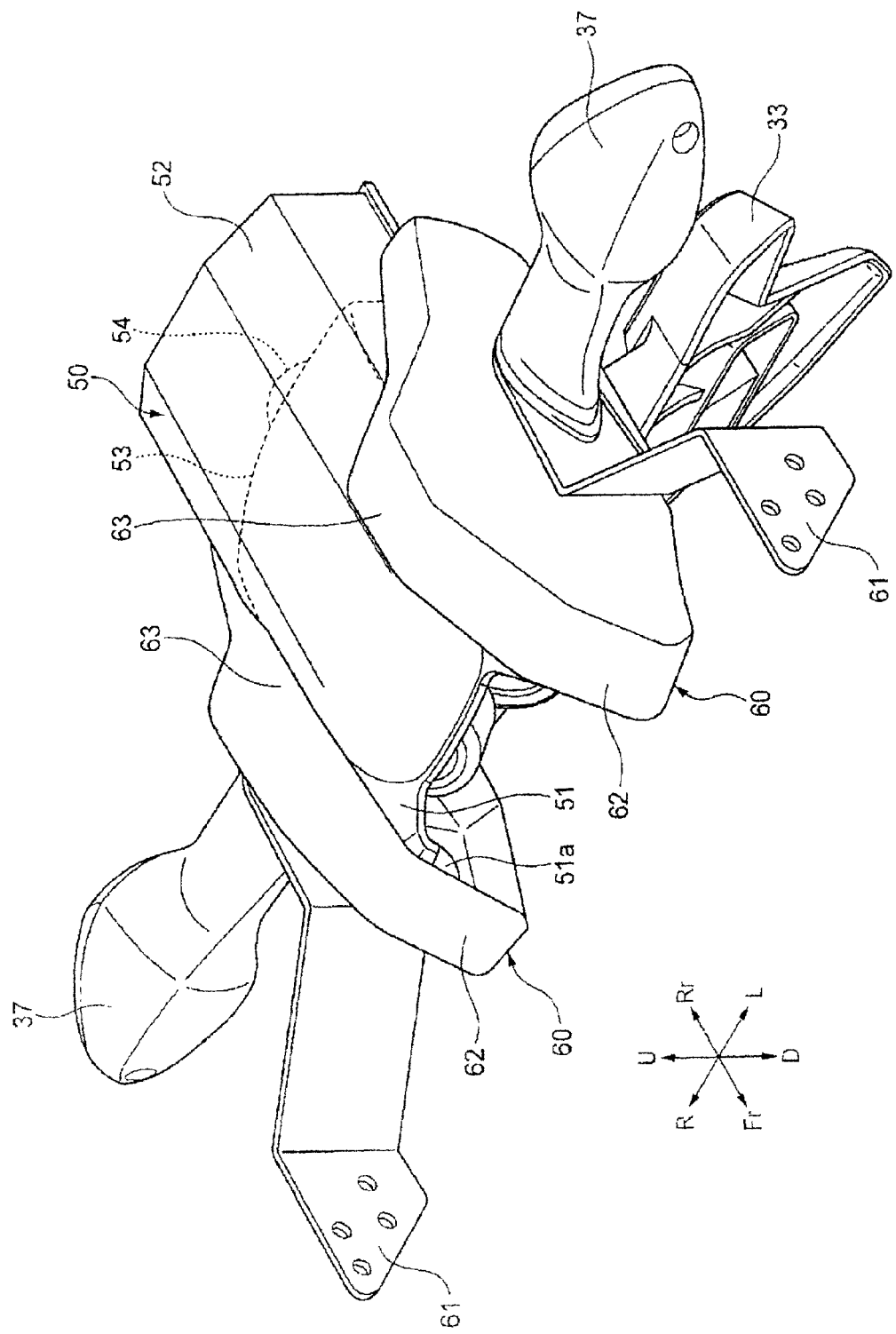
FIG. 2 is a perspective view of the tail light device and a tail light support stay shown in FIG. 1.
Figure 3:
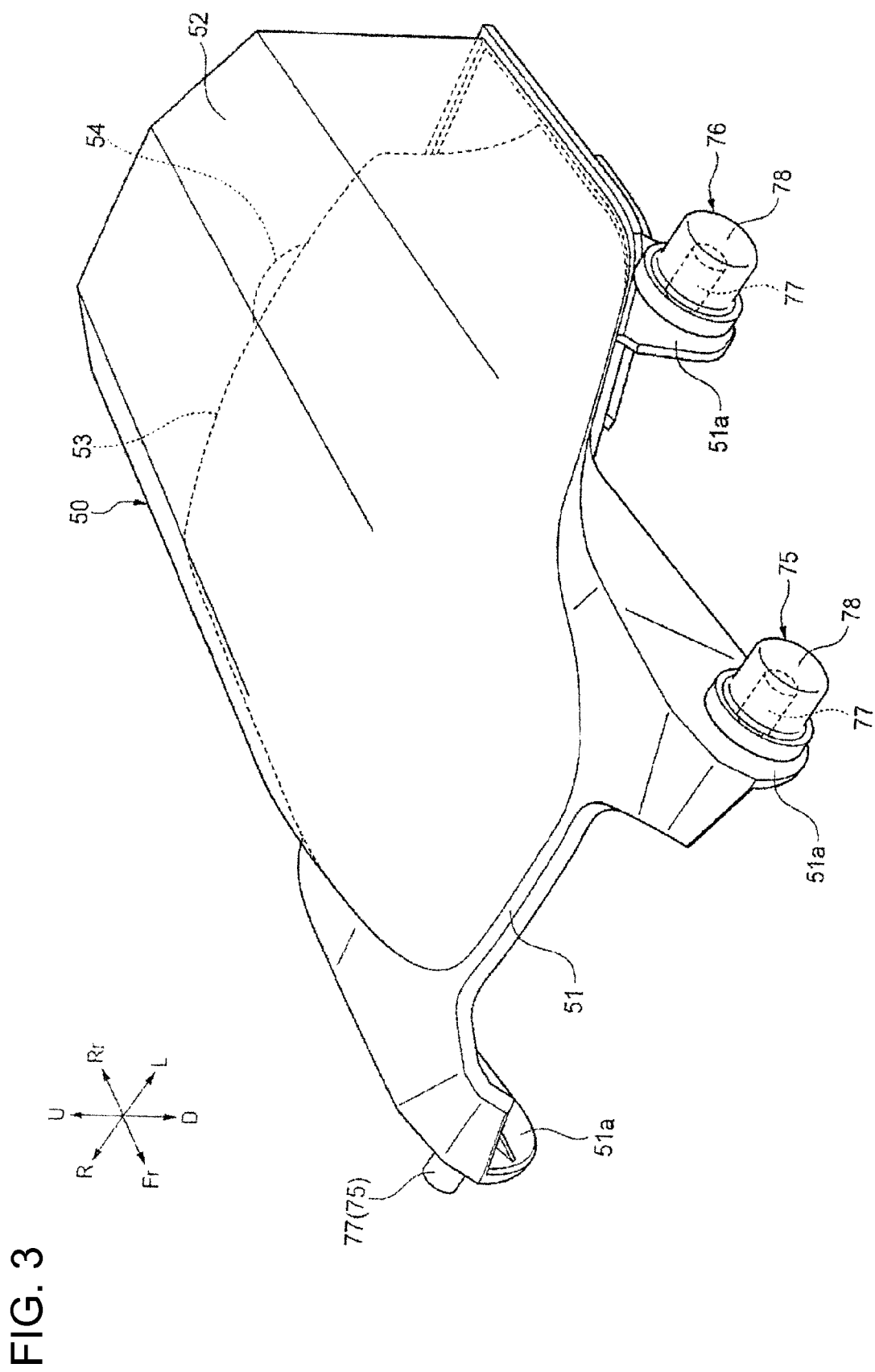
FIG. 3 is a perspective view of the tail light device shown in FIG. 2.

As shown in FIGS. 1, 2 and 4, the pair of left and right tail light support stays 60, which are attached to rear ends of the rear frames 16, can have a pair of left and right front stays 61 extended rearward and a pair of left and right rear stays 62 which are attached to rear ends of the left and right front stays 61 and to which the tail light device 50 is attached. Further, the front stays 61 and the rear stays 62 are formed as separate bodies.

As shown in FIGS. 2 and 4, the pair of left and right front stays 61 can be plate members formed in a crank shape with light-weight alloy. The rear winkers 37 are fastened, together with the rear stays 62, to the rear ends of the front stays 61.

As shown in FIGS. 2 and 4, the pair of left and right rear stays 62 are dome members curved to be an outward convex shape which are formed to have an approximately oval sectional shape with resin. The tail light device 50 is held between the rear stays 62 in a vehicle width direction. Further, a cover 63 which overlaps side portions of an upper surface of the tail light lens 52 in a top view is formed in an upper surface of the rear stays 62.

Further, in the present example, as shown in FIGS. 3 to 9, a front first engagement concave member 71 and a front second engagement concave member 72 to enable movement of a support position of the tail light device 50 with respect to the license plate 36 in a vehicle longitudinal direction are provided in front inner side surfaces of the rear stays 62. A rear first engagement concave member 73 and a rear second engagement concave member 74 to enable movement of the support position of the tail light device 50 with respect to the license plate 36 in the vehicle longitudinal direction, are provided in rear inner side surfaces of the rear stays 62. A front engagement convex member 75 for concave-convex engagement with any one of the front first engagement concave member 71 and the front second engagement concave member 72 is provided in a front side surface of the tail light device 50. A rear engagement convex member 76 for concave-convex engagement with any one of the rear first engagement concave member 73 and the rear second engagement concave member 74 is provided in a rear side surface of the tail light device 50.

Figure 7:
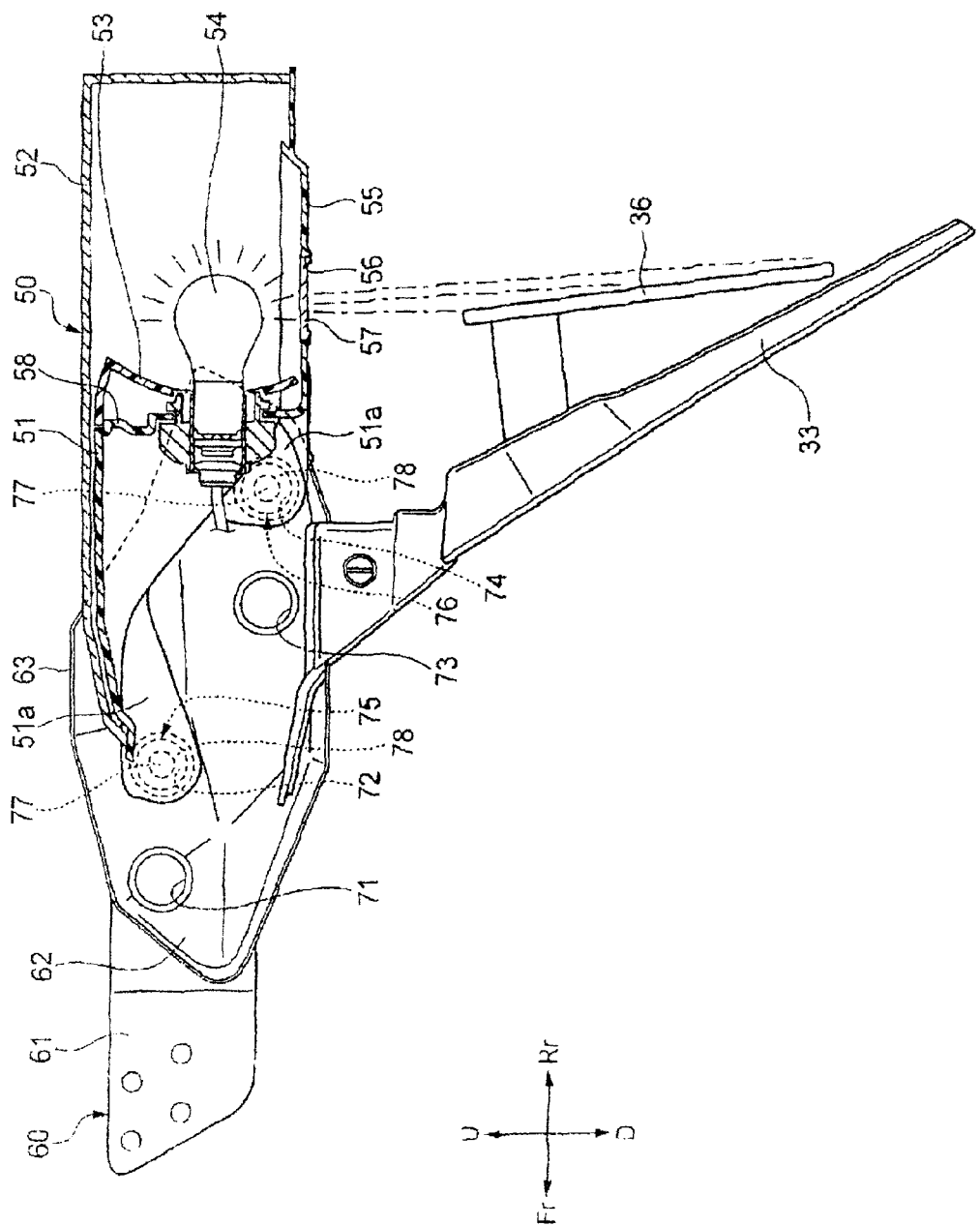
FIG. 7 is a cross-sectional view explaining a status where the tail light device is provided in a rear irradiation position.
Figure 8:
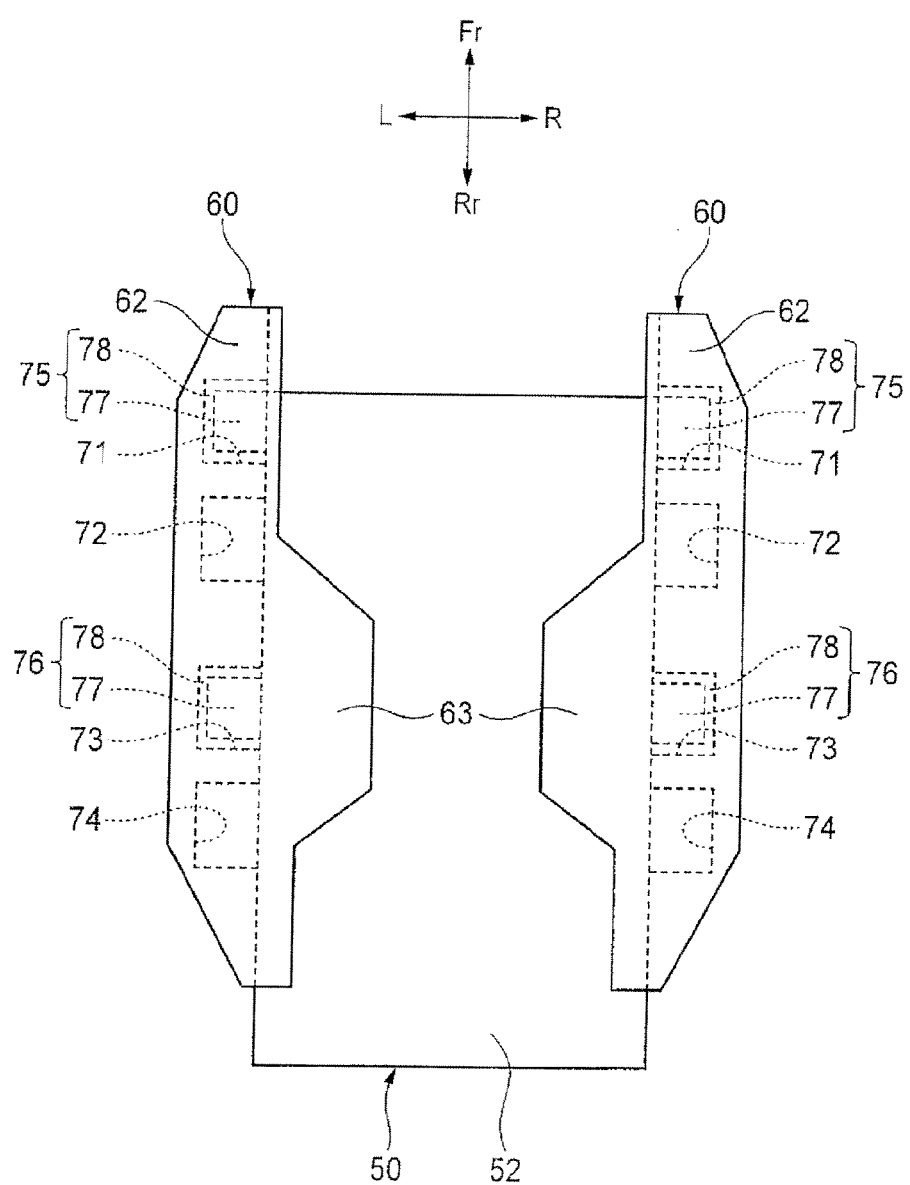
FIG. 8 is a schematic plan view explaining a status where the tail light device is provided in the front irradiation position.
Figure 9:
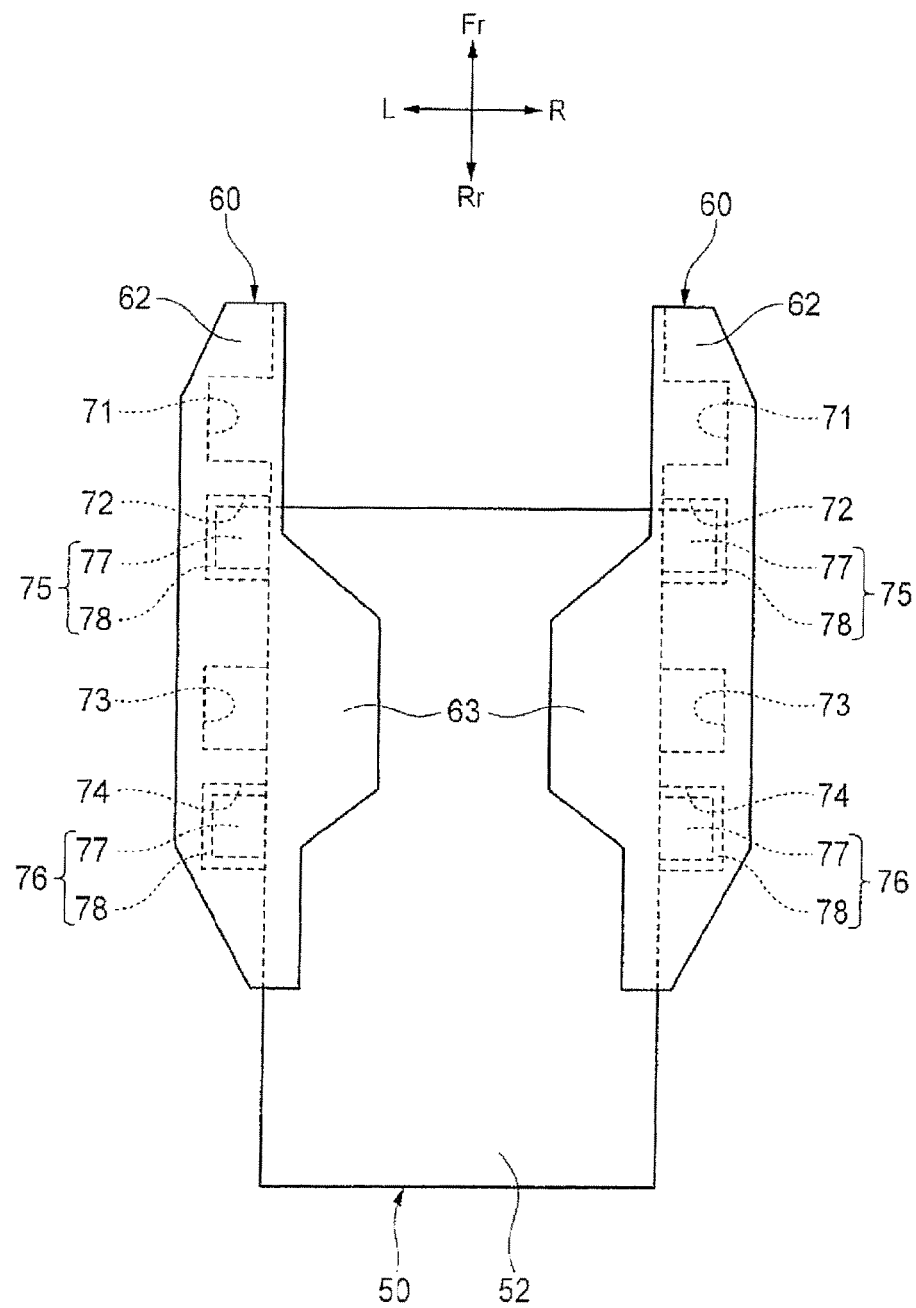
FIG. 9 is a schematic plane view explaining a status where the tail light device is provided in the rear irradiation position.

The front first engagement concave member 71 and the rear first engagement concave member 73 support the tail light device 50 in a front irradiation position. The front second engagement concave member 72 and the rear second engagement concave member 74 support the tail light device 50 in a rear irradiation position. Note that, as shown in FIG. 6, the front irradiation position refers to a position to irradiate the license plate 36 of, for example a European specification vehicle, and as shown in FIG. 7, the rear irradiation position refers to a position to irradiate the license plate 36 of, for example, a North-American specification vehicle.

Further, in the present example, the front first engagement concave member 71, the front second engagement concave member 72, the rear first engagement concave member 73, and the rear second engagement concave member 74, are provided in positions shifted in the rear stays 62 in the vehicle longitudinal direction. They provided at heights shifted in the rear stays 62 at a vehicle vertical direction.

Further, the front engagement convex member 75 and the rear engagement convex member 76 can have pins 77 projected outward from support pieces 51a formed in front, rear, left and right, i.e. total of four positions of the tail light housing 51. Elastic bodies 78 can be provided between the pins 77 and the above-described respective engagement concave members 71, 72, 73 and 74.

In the tail light device 50 having this structure, upon assembly of the tail light device 50, the front engagement convex member 75 is engaged with the front first engagement concave member 71, and the rear engagement convex member 76 is engaged with the rear first engagement concave member 73. The tail light device 50 can thus be provided in the above-described front irradiation position (see FIGS. 6 and 8). The front engagement convex member 75 can be engaged with the front second engagement concave member 72 and the rear engagement convex member 76 is engaged with the rear second engagement concave member 74, thereby the tail light device 50 is provided in the above-described rear irradiation position (see FIGS. 7 and 9). Accordingly, even though the attachment angle of the license plate 36 differs in accordance with specification in each country, the license plate 36 can be securely irradiated.

As described above, according to the tail light device 50 in the present example, as the front first engagement concave member 71 and the front second engagement concave member 72, provided in the front part of the rear stays 62, enable movement of the support position of the tail light device 50 with respect to the license plate 36 in the vehicle longitudinal direction. The rear first engagement concave member 73 and the rear second engagement concave member 74, provided in the rear part of the rear stays 62, enable movement of the support position of the tail light device 50 with respect to the license plate 36 in the vehicle longitudinal direction. The front engagement convex member 75 is provided in the front part of the tail light device 50 and engaged with any one of the front first engagement concave member 71 and the front second engagement concave member 72. The rear engagement convex member 76 is provided in the rear part of the tail light device 50 and engaged with any one of the rear first engagement concave member 73 and the rear second engagement concave member 74 are provided, even though the attachment angle of the license plate 36 differs in accordance with specification in each country, the license plate 36 can be securely irradiated. Further, as the tail light support stays 60 can also be used without any change, the cost of manufacturing can be reduced.

Further, according to the tail light device 50 in the present example, as the front first engagement concave member 71, the front second engagement concave member 72 and the front engagement convex member 75 are concave-convex engaged, and the rear first engagement concave member 73, the rear second engagement concave member 74 and the rear engagement convex member 76 are concave-convex engaged, it is not necessary to fasten the tail light device to the tail light support stays with screws or the like. Thus the tail light device can be simply and securely supported.

Further, according to the tail light device 50 in the present example, as the front first engagement concave member 71, the front second engagement concave member 72, the rear first engagement concave member 73, and the rear second engagement concave member 74 are provided in the rear stays 62, and the front engagement convex member 75 and the rear engagement convex member 76 are provided in the tail light device 50. This compares to a case where the tail light device 50 is provided with the engagement concave members 71, 72, 73 and 74, the capacity of the tail light device 50 necessary for accommodation of the tail light bulb 54 and the reflector 53 is not impaired.

Further, according to the tail light device 50 in the present example, as the front first engagement concave member 71, the front second engagement concave member 72, the rear first engagement concave member 73 and the rear second engagement concave member 74 are provided in positions shifted in the vehicle longitudinal direction in the rear stays 62, the interval between the front first engagement concave member 71 and the front second engagement concave member 72, and the rear first engagement concave member 73 and the rear second engagement concave member 74 can be wide. Thus, swinging or undesired movement of the tail light device 50 can be suppressed.

Further, according to the tail light device 50 in the present example, the front first engagement concave member 71 and the front second engagement concave member 72, the rear first engagement concave member 73 and the rear second engagement concave member 74 are provided at heights shifted in the vehicle vertical direction in the rear stays 62. This also suppresses swinging or undesirable movement of the tail light device 50 in the vertical direction.

Further, according to the tail light device 50 in the present example, as the front engagement convex member 75 and the rear engagement convex member 76 can have the pins 77 projected from the support pieces 51a of the tail light housing 51 and the elastic bodies 78 provided between the pins 77 and the respective engagement concave members 71, 72, 73 and 74, transmission of vibration of the vehicle body to the tail light bulb 54 of the tail light device 50 can be prevented.

Further, according to the tail light device 50 in the present example, as the tail light device 50 is held between the pair of left and right tail light support stays 60, it is not necessary to prepare screws and the like for attachment of the tail light device 50. With this arrangement, as the number of parts can be reduced, the cost of manufacturing can be reduced.

Further, according to the tail light device 50 in the present example, as the cover 63 which overlaps the tail light lens 52 of the tail light device 50 in a top view is provided in the upper surface of the rear stays 62 of the tail light support stays 60, the tail light lens 52 of the tail light device 50 can be protected.

Further, according to the tail light device 50 in the present example, in the tail light support stays 60, as the front stays 61 and the rear stays 62 are separately formed and the front stays 61 and the rear stays 62 are mutually connected, the materials of the front stays 61 and the rear stays 62 can be changed. With this arrangement, for example, the front stays 61 may be made of metal and the rear stays 62 may be made of resin. Further, even in a vehicle model having a different vehicle body shape, the invention can be applied by using the same tail light device 50 and the rear stays 62 and only changing the front stays 61.

Further, according to the tail light device 50 in the present example, as the rear winkers or turn signals 37 are attached to the rear stays 62 of the tail light support stays 60, it is not necessary to separately prepare parts for attachment of the rear winkers 37. With this arrangement, as the number of parts can be reduced, the cost of manufacturing can be reduced.

Further, according to the tail light device 50 in the present example, as the front stays 61 of the tail light support stays 60 are formed of light weight alloy and the rear stays 62 are formed of resin, the tail light support stays 60 can be weight-reduced.

Figure 15:
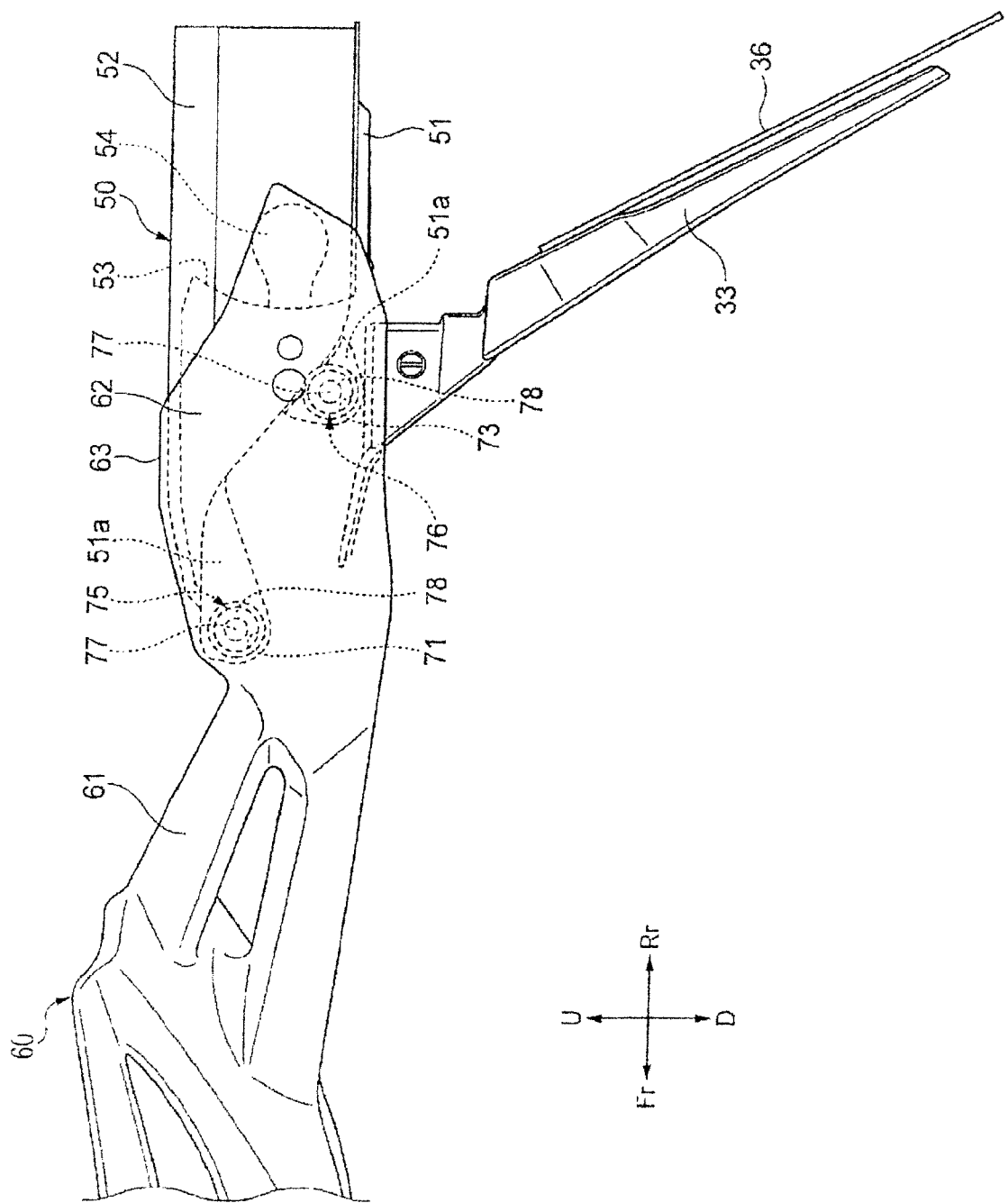
FIG. 15 is a left side view for explaining a first modification of the first embodiment of the tail light device according to the present invention.

Note that as a modification of the present example, as shown in FIG. 15, the front stays 61, also made of resin, may be integrally formed with the rear stays 62. According to this modification, as the front stays 61 and the rear stays 62 are integrally formed, the number of parts can be reduced, and the cost of manufacturing can be reduced. Further, the front stays 61 and the rear stays 62, made of light weight alloy, may be integrally formed.

Figure 16:
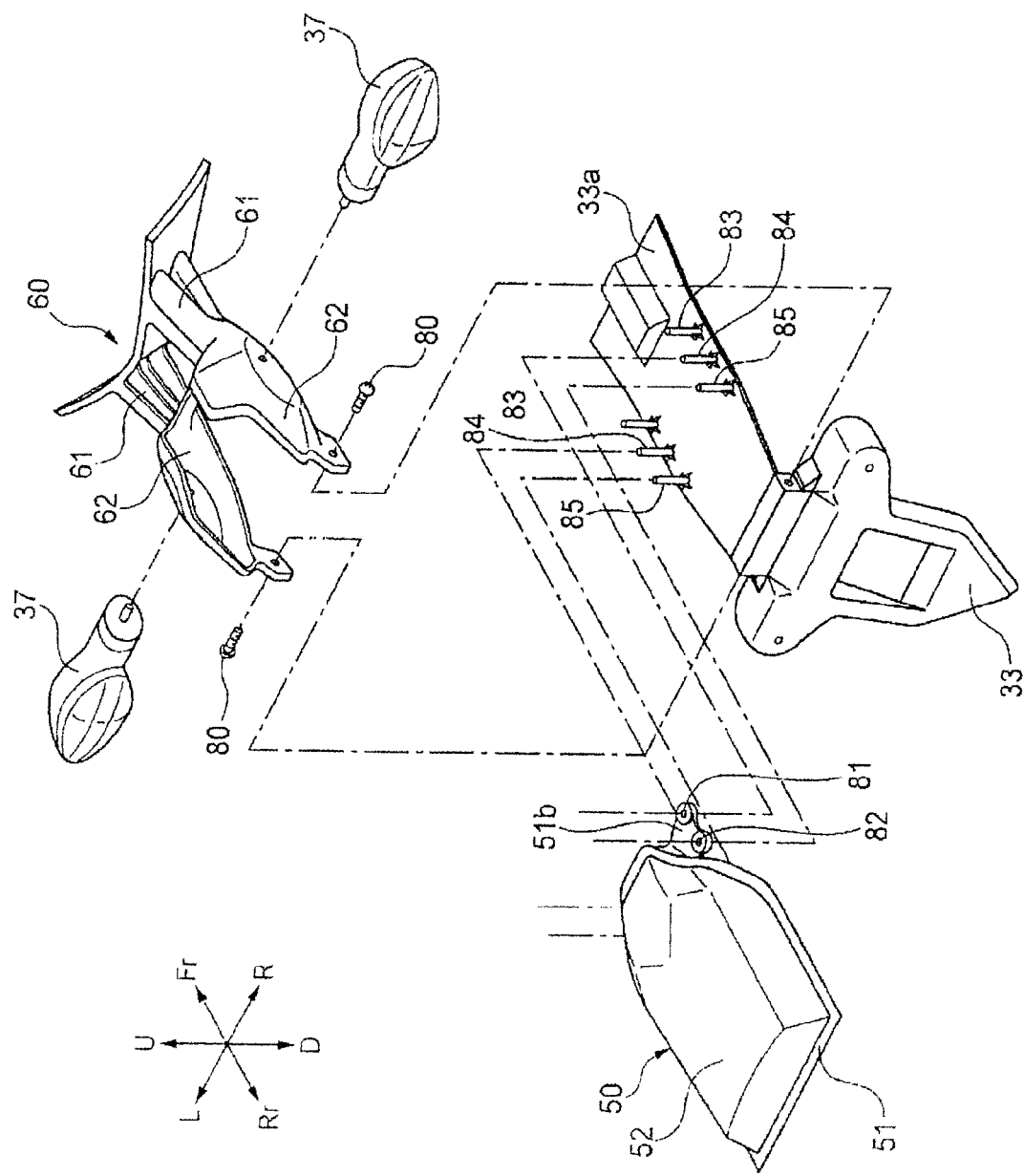
FIG. 16 is an exploded perspective view for explaining a second modification of the first embodiment of the tail light device according to the present invention.

A second modification of the embodiment will be described with reference to FIG. 16. In the tail light device 50 in the modification, a pair of right and left mounting ribs 51b can be provided on the opposing sides of the front end of the tail light housing 51 in the vehicle right-left direction and extends horizontally toward the front of the vehicle. A front engagement hole 81 and a rear engagement hole 82 which are engaged members are drilled through each of the mounting ribs 51b in the vehicle vertical direction. A rear portion of the rear fender 33 is fastened to the rear ends of a pair of the rear stays 62 with screws 80.

The pair of right and left mounting ribs 51b are shaped to be located within the region of the tail light housing 51 in the vehicle lateral direction. Thereby, the front end of the tail light device 50 can be narrowed and the front engagement holes 81 and the rear engagement holes 82 can be placed within the interior of the tail light device 50 in the vehicle lateral direction, thus providing slim and neat appearance of the entire tail light device 50 without increase in size.

Further, front engagement pins 83, common engagement pins 84 and rear engagement pins 85, which are engagement members, extend upward from a plate-shaped base 33a of the rear fender 33 disposed on the undersurface of the tail light housing 51.

The front engagement pins 83, the common engagement pins 84 and the rear engagement pins 85 are respectively formed in positions in the vehicle right-left direction while being arranged in a line in the vehicle longitudinal direction. The distance between the front engagement pin 83 and the common engagement pin 84 and the distance between the common engagement pin 84 and the rear engagement pin 85 are set to be equal to the distance between the front engagement hole 81 and the rear engagement hole 82.

In the tail light device 50 having this structure, upon assembly of the tail light device 50, the front engagement pin 83 is engaged with the front engagement hole 81, and the common engagement pin 84 is engaged with the rear engagement hole 82. The tail light device 50 is thus provided in the above-described front irradiation position. Further, the common engagement pin 84 is engaged with the front engagement hole 81 and the rear engagement pin 85 is engaged with the rear engagement hole 82. The tail light device 50 is thus provided in the above-described rear irradiation position. Accordingly, even though the attachment angle of the license plate 36 differs in accordance with specification in each country, the license plate 36 can be securely irradiated.

Figure 17:
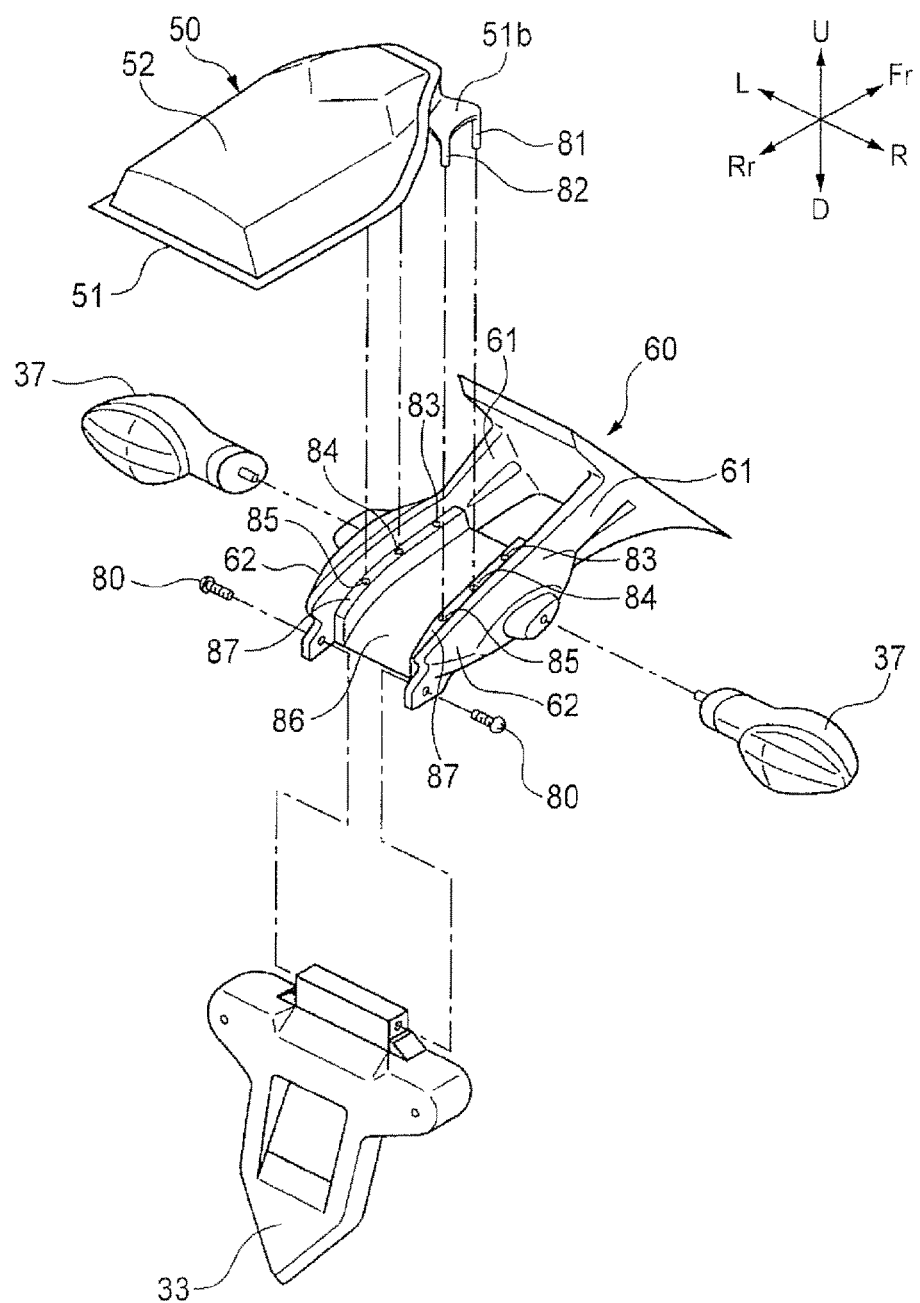
FIG. 17 is an exploded perspective view for explaining a third modification of the first embodiment of the tail light device according to the present invention.

A third modification of the embodiment will be described with reference to FIG. 17. In the tail light device 50 in this example, a pair of right and left mounting ribs 51b are provided on the opposing sides of the front end of the tail light housing 51 in the vehicle right-left direction, and extend horizontally toward the front of the vehicle. A front engagement pin 81 and a rear engagement pin 82, which are engaged members, protrude downward from each of the mounting ribs 51b.

The rear fender 33 is fastened to the rear ends of a pair of the rear stays 62 with screws 80.

The pair of right and left mounting ribs 51b are shaped to be located within the region of the tail light housing 51 in the vehicle lateral direction. Thereby, the front end of the tail light device 50 can be narrowed and the front engagement pins 81 and the rear engagement pins 82 can be placed within the interior of the tail light device 50 in the vehicle lateral direction. This configuration can provide a slim and neat appearance of the entire tail light device 50, without increase in size.

Further, the tail light support stay 60 can include a pair of rear stays 62, which respectively have lower portions coupled to each other by a plate-shaped coupler 86, and a pair of front stays 61 formed integrally with the rear stays 62. Step-shaped tail-light mounting members 87 respectively protrude inward from lower portions of inner side faces of a pair of the rear stays 62 and extend in the vehicle longitudinal direction. Front engagement holes 83, common engagement holes 84 and rear engagement holes 85, which are engagement members, are formed in the upper surfaces of the tail-light mounting members 87.

The front engagement holes 83, the common engagement holes 84 and the rear engagement holes 85 are arranged in a line in the vehicle longitudinal direction. The distance between the front engagement hole 83 and the common engagement hole 84 and the distance between the common engagement hole 84 and the rear engagement hole 85 are set to be equal to the distance between the front engagement pin 81 and the rear engagement pin 82.

In the tail light device 50 having this structure, upon assembly of the tail light device 50, the front engagement pin 81 is engaged with the front engagement hole 83, and the rear engagement pin 82 is engaged with the common engagement hole 84. The tail light device 50 is thus provided in the above-described front irradiation position. Further, the front engagement pin 81 is engaged with the common engagement hole 84 and the rear engagement pin 82 is engaged with the rear engagement hole 85, thereby the tail light device 50 is provided in the above-described rear irradiation position. Accordingly, even though the attachment angle of the license plate 36 differs in accordance with specification in each country, the license plate 36 can be securely irradiated.

Figure 18:
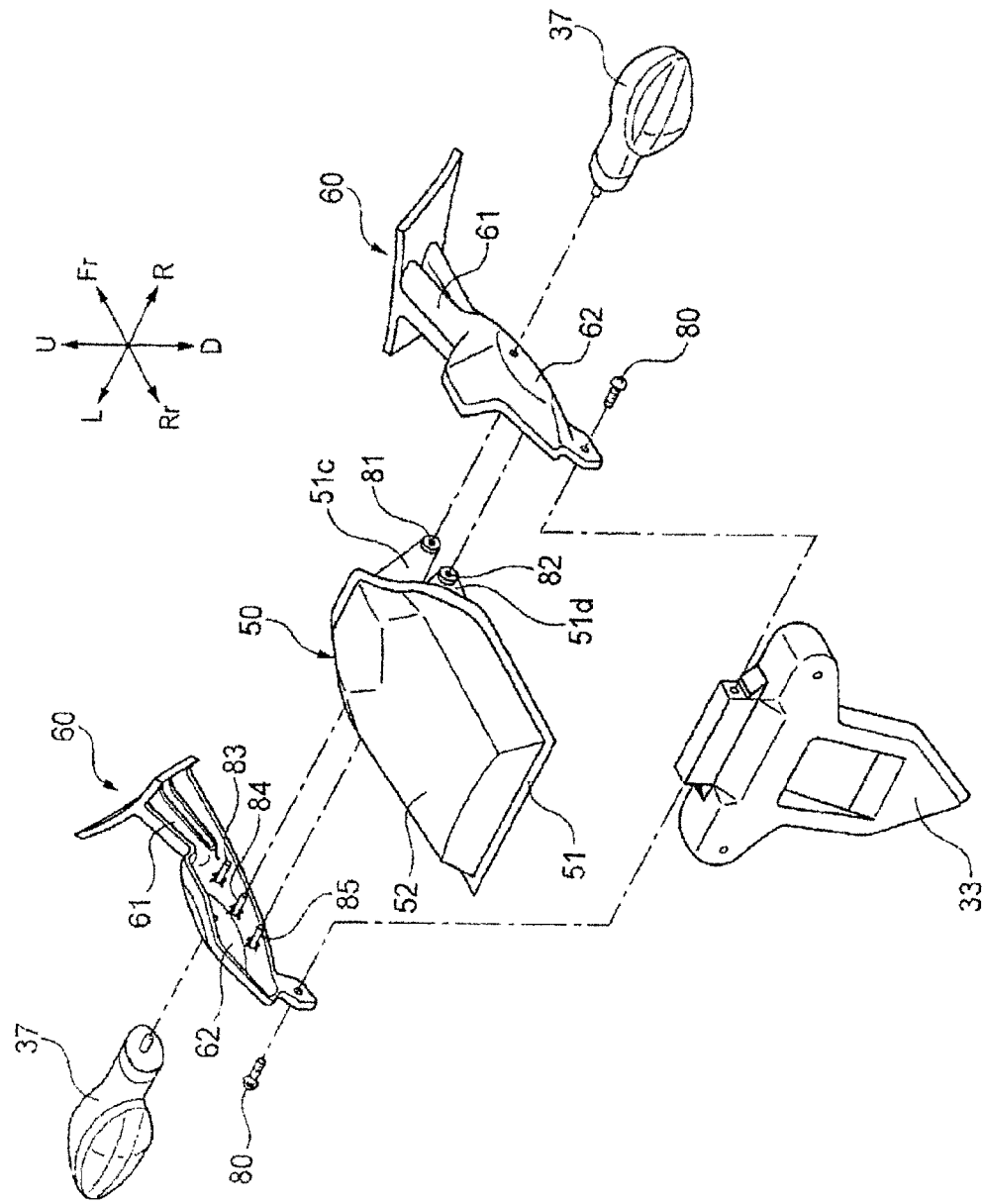
FIG. 18 is an exploded perspective view for explaining a fourth modification of the first embodiment of the tail light device according to the present invention.
Figure 19:
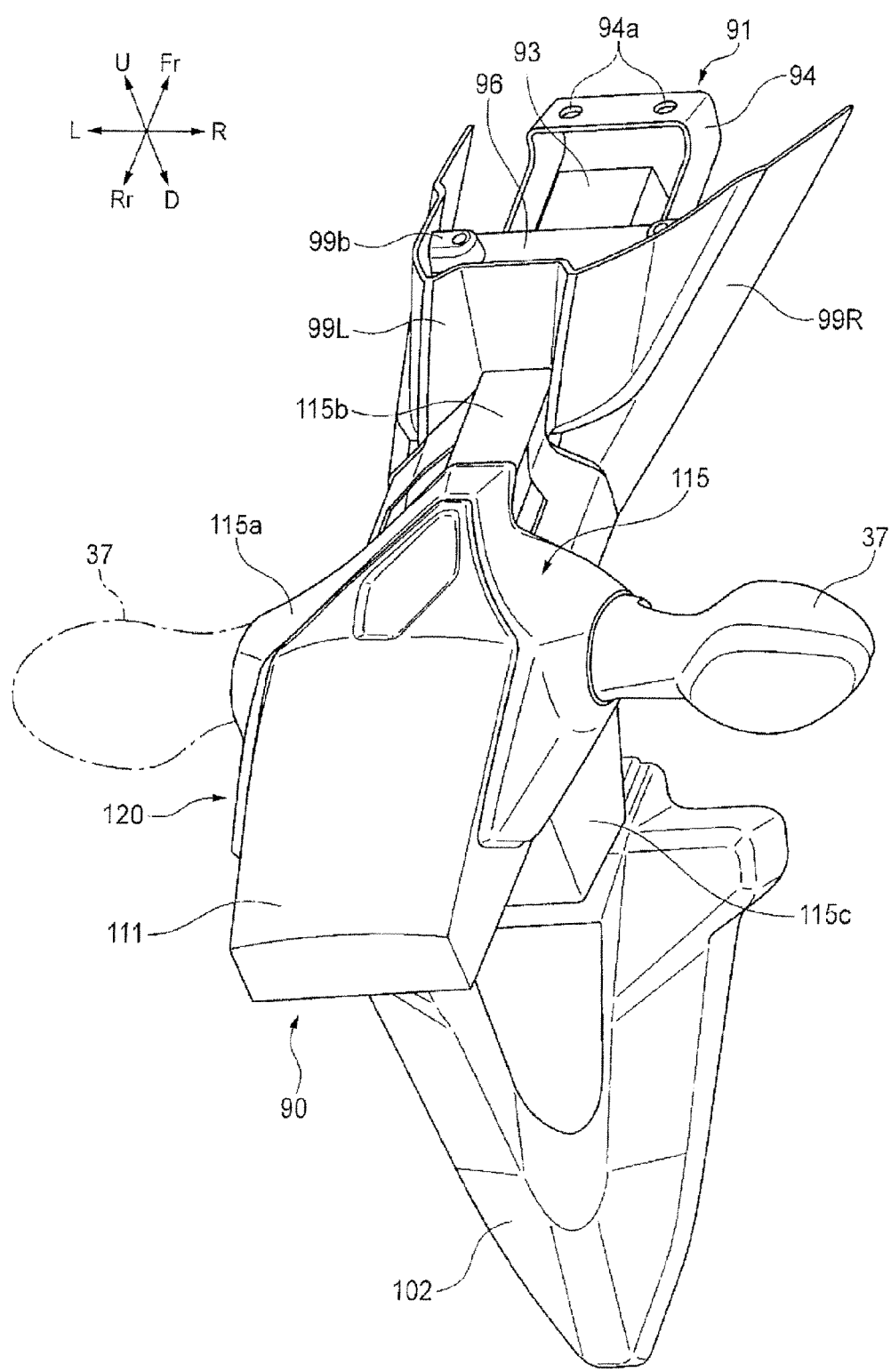
FIG. 19 is a perspective view for explaining a second embodiment of a tail light device according to the present invention.

A fourth modification of the embodiment will be described with reference to FIG. 18. In the tail light device 50 in this example, two pairs of right and left arms 51c, 51d are provided on the opposing sides of the front end of the tail light housing 51 in the vehicle right-left direction and extends diagonally downward and toward the front of the vehicle. A front engagement hole 81, which is an engaged member, extends through the arm 51c in the right-left direction. A rear engagement hole 82, which is an engaged member, extends through the arm 51d in the right left direction. The rear fender 33 is fastened to the rear ends of a pair of the rear stays 62 with screws 80.

The pairs of right and left arms 51c, 51d can be shaped to be located within the region of the tail light housing 51 in the vehicle lateral direction. Thereby, the front end of the tail light device 50 can be narrowed and the front engagement holes 81 and the rear engagement holes 82 can be placed within the interior of the tail light device 50 in the vehicle lateral direction, thus providing slim and neat appearance of the entire tail light device 50, without increase in size.

Further, front engagement pins 83, common engagement pins 84 and rear engagement pins 85, which are engagement members, can extend inward from the respective inner side surfaces of a pair of the rear stays 62 of the tail light support stay 60.

The front engagement pins 83, the common engagement pins 84 and the rear engagement pins 85 are arranged in line in the vehicle longitudinal direction. The distance between the front engagement pin 83 and the common engagement pin 84 and the distance between the common engagement pin 84 and the rear engagement pin 85 are set to be equal to the distance between the front engagement hole 81 and the rear engagement hole 82.

In the tail light device 50 having this structure, upon assembly of the tail light device 50, the front engagement pin 83 is engaged with the front engagement hole 81, and the common engagement pin 84 is engaged with the rear engagement hole 82, thereby the tail light device 50 is provided in the above-described front irradiation position. Further, the common engagement pin 84 is engaged with the front engagement hole 81 and the rear engagement pin 85 is engaged with the rear engagement hole 82, thereby the tail light device 50 is provided in the above-described rear irradiation position. Accordingly, even though the attachment angle of the license plate 36 differs in accordance with specification in each country, the license plate 36 can be securely irradiated.

Note that the present invention is not limited to the above-described examples described in these embodiments, but can be arbitrarily changed without departing from the subject matter of the present invention.

For example, in an embodiment discussed above, the convex member is formed on the tail light device side while the concave member is formed on the tail light support stay side. However, the present invention is not limited to this arrangement, but it may be arranged, for example, such that the concave member is formed on the tail light device side while the convex member is formed on the tail light support stay side.

Next, another embodiment of a motorcycle tail light device according to the present invention will be described with reference to FIG. 19 to FIG. 27. Note that the same or similar components/parts as or to those in the first embodiment are designated the same reference signs in the drawings and descriptions are omitted or simplified.

In the embodiment as illustrated in FIG. 19 to FIG. 27, a sub frame 91 is fixed to the rear end of the rear frame 16 of the vehicle body frame 11, and a tail light device 90 is attached to the rear end of the tail light support stay 92 which is provided movably relative to the sub frame 91 in the vehicle longitudinal direction.

As illustrated in FIG. 20 to FIG. 25, the sub frame 91 includes a rectangular cross-section angled pipe 93, a gusset 94 which is welded to the front end of the angled pipe 93 to fasten the sub frame 91 to the rear frame 16, a rear fender stay 95 which is welded to the rear end of the angled pipe 93 and has a lower end to which the rear fender 33 is attached, and a rear cover support plate 96 which is welded to a front upper face of the angled pipe 93.

Slotted holes 97 extending in the vehicle longitudinal direction are respectively formed in the right and left side faces of the angled pipe 93. Further, two bolt through-holes 94a are formed in the top face of the leading end of the gusset 94 to receive bolts, not shown, which pass through them for fixing the sub frame 91 to the rear frame 16. The rear fender stay 95 has a pair of through-holes 100 drilled for fixing rear bosses 99a of a pair of right and left rear covers 99R, 99L which will be described later, and four screw through-holes 101 drilled for fixing a rear fender 102. The rear cover support plate 96 has screw through-holes 103 drilled for fixing front ribs 99b of a pair of the right and left rear covers 99R, 99L.

Figure 20:
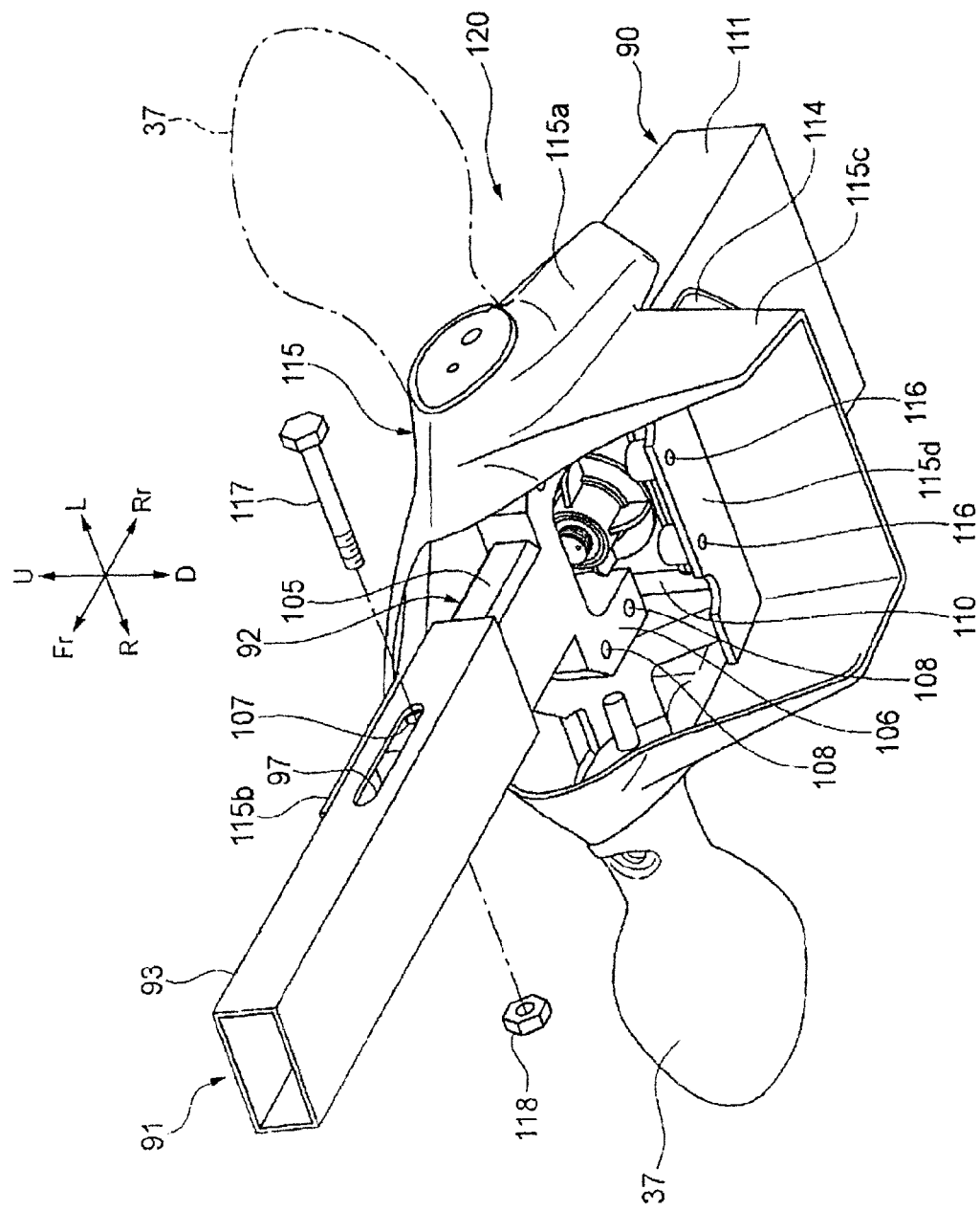
FIG. 20 is a perspective view of the tail light device shown in FIG. 19 when viewed from diagonally below.
Figure 21:
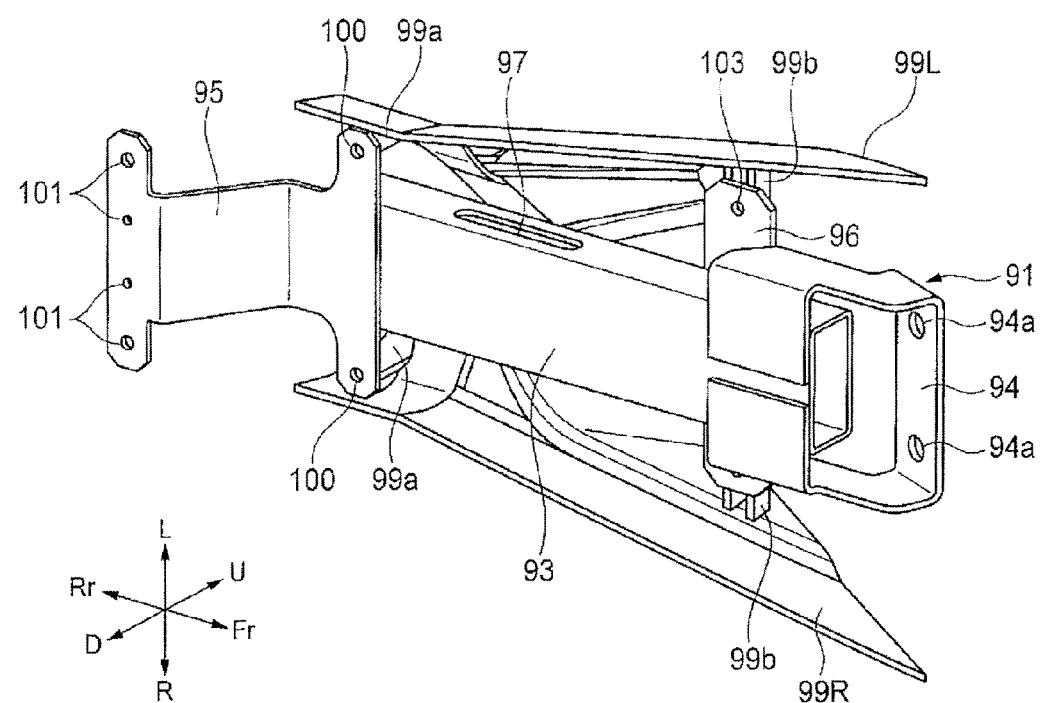
FIG. 21 is a perspective view of a sub frame with a pair of right and left rear covers mounted thereon when viewed from diagonally below.
Figure 22:
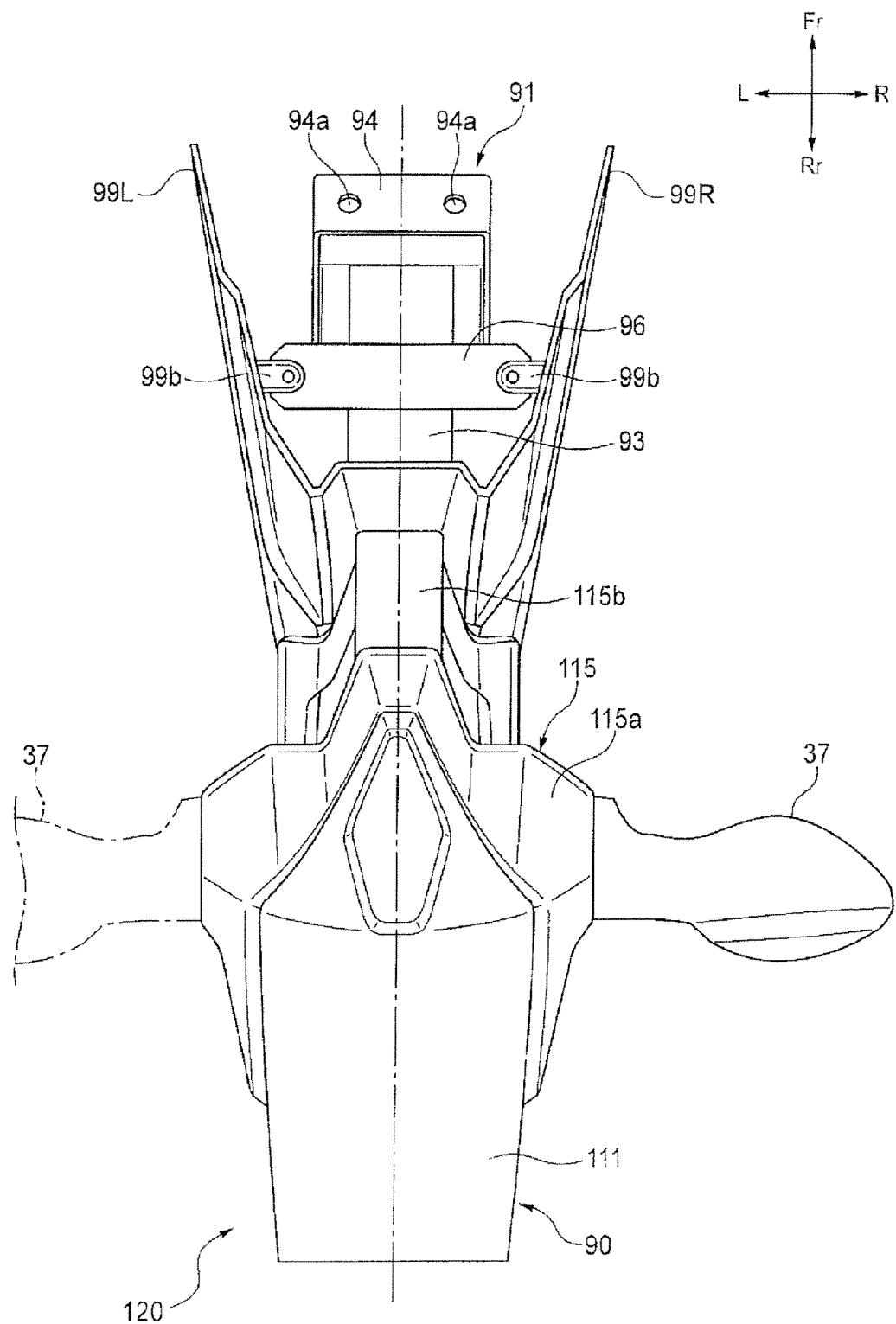
FIG. 22 is a plane view of the tail light device shown in FIG. 19.
Figure 23:
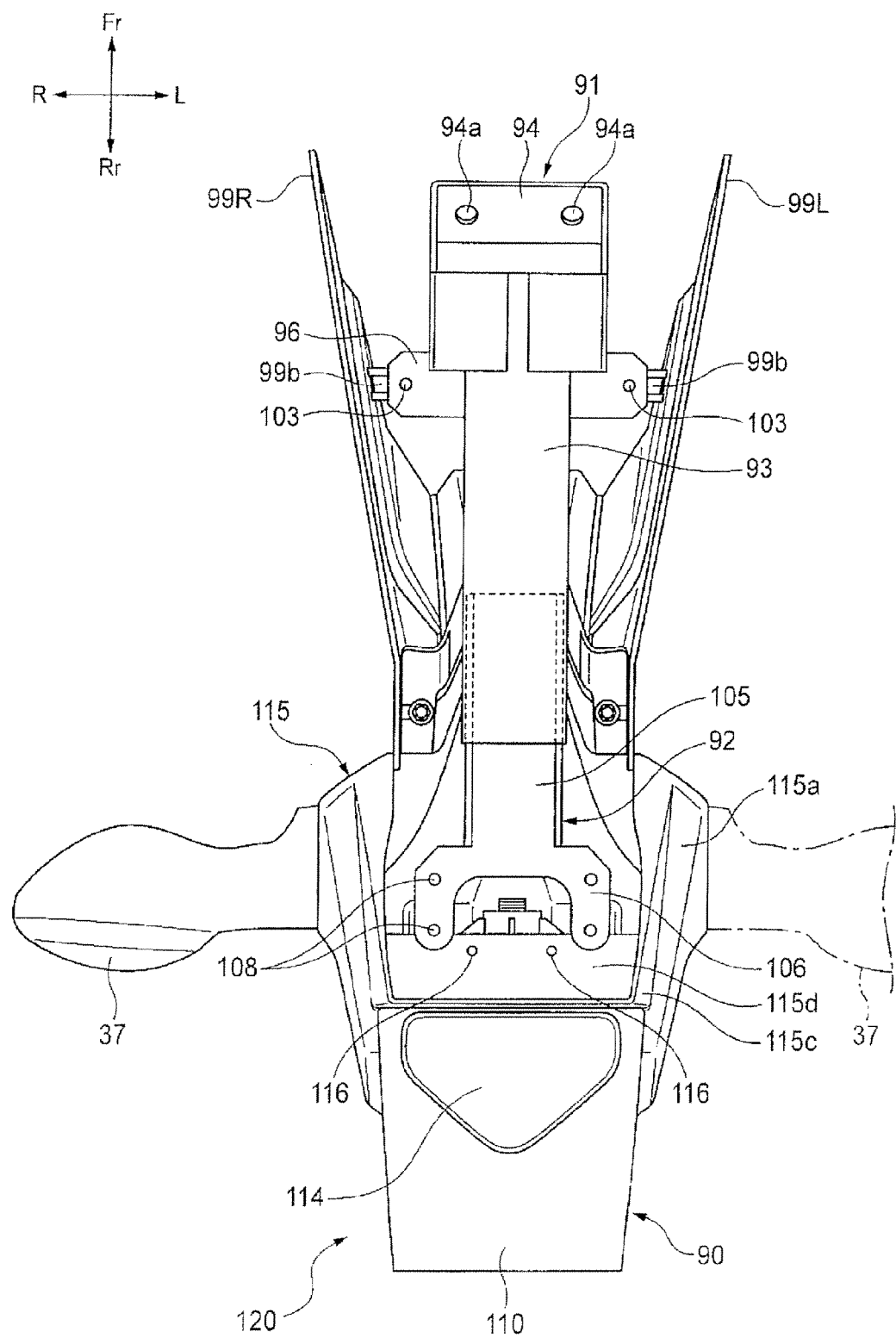
FIG. 23 is a underside view of the tail light device shown in FIG. 22.

As illustrated in FIG. 20 and FIG. 23, the tail light support stay 92 can include a rectangular cross-section angled pipe (fit member) 105 which is slidably inserted into the angled pipe 93 of the sub frame 91, and a Y-shaped tail light mounting member 106 which is bifurcated at the rear end of the angled pipe 105 in the right and left directions to extend rearward. Fixing holes 107 are respectively drilled in the right and left side faces of the angled pipe 105. The tail light mounting member 106 has four bolt through-holes 108 drilled in a bilaterally symmetrical arrangement for fixing the tail light device 90.

Figure 26:
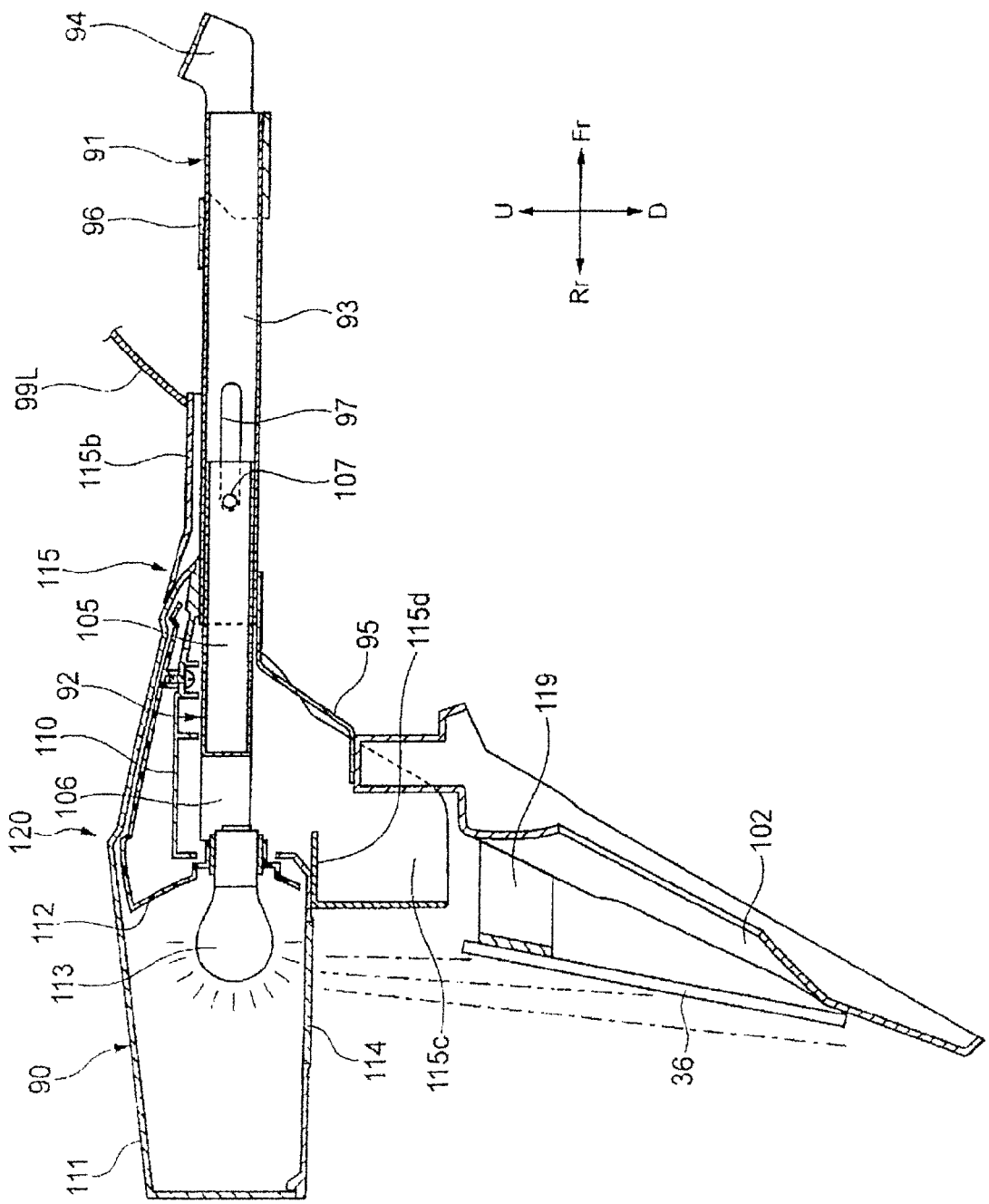
FIG. 26 is a cross-sectional view explaining a status where the tail light device is provided in a rear irradiation position.
Figure 27:
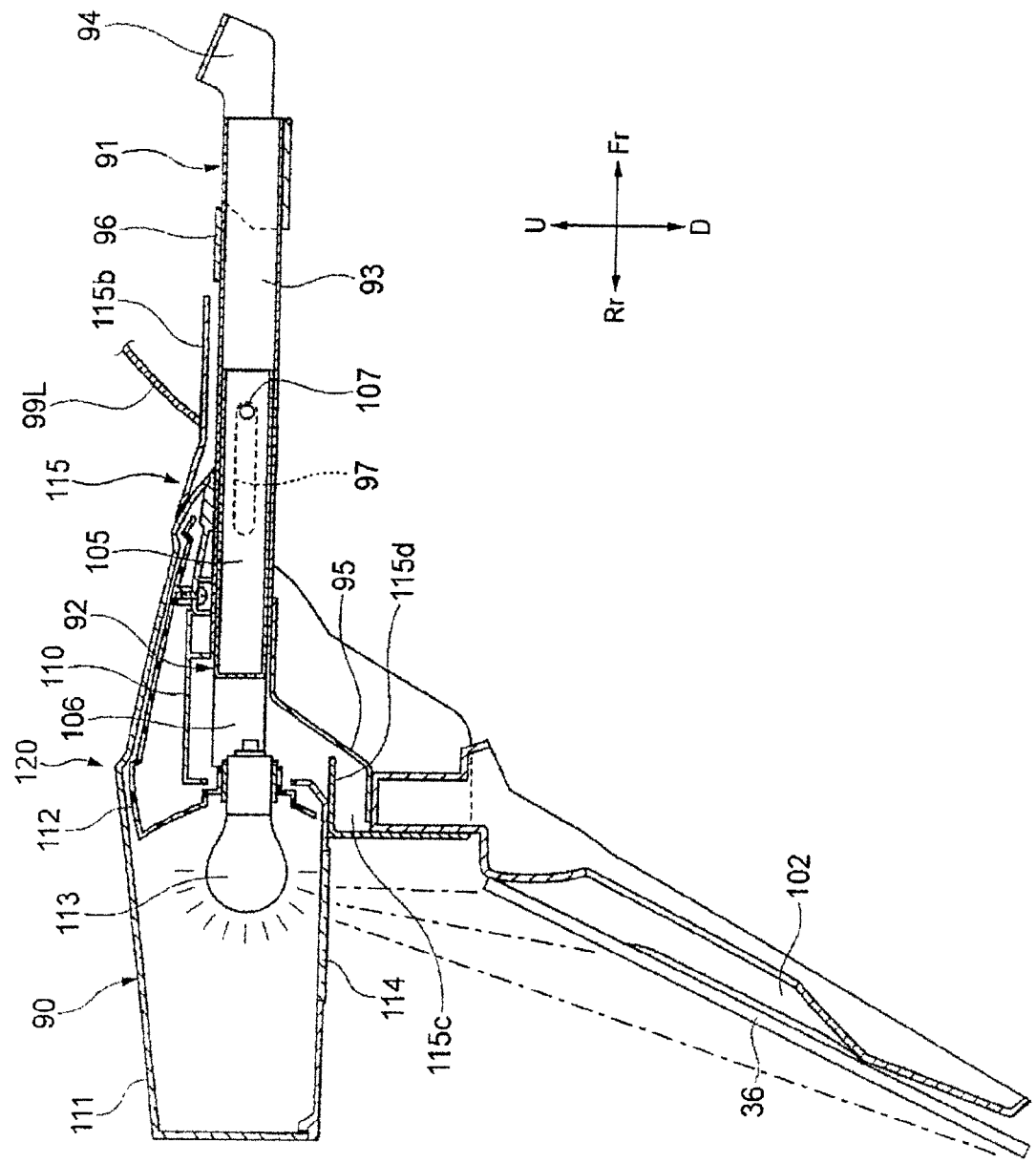
FIG. 27 is a cross-sectional view explaining a status where the tail light device is provided in a front irradiation position.

As illustrated in FIG. 26 and FIG. 27, the tail light device 90 can include a tail light housing 110, a tail light lens 111 covering the entire front upper surface of the tail light housing 110 and closing the entire rear opening of the tail light housing 110, a reflector 112 secured to the tail light housing 110 and placed within the tail light lens 111, a tail light bulb 113 placed on the reflector 112, and a license plate irradiation lens 114 placed on the underside of the tail light housing 110 to guide the bulb light from the tail light bulb 113. In the embodiment, the tail light housing 110 and the reflector 112 are formed independently of each other, but the present invention is not limited to this. The tail light housing 110 and the reflector 112, for example, may be formed in one piece and a light reflective area may be aluminized.

As illustrated in FIG. 19, FIG. 20, FIG. 22 and FIG. 23, the tail light device 90 can be covered with a cover 115 which includes a side-face cover 115a which covers an area from a front upper face to right and left sides of the tail light lens 111, a plate-shaped upper-face cover 115b which extends forward from the side-face cover 115a to cover the upper face of the angled pipe 93 of the sub frame 91, and a rear cover 115c of approximately C-shaped horizontal section which extends downward from the side-face cover 115a to cover an upper portion of the rear fender 102.

A mounting rib 115d, having two screw through-holes 116, is provided horizontally inside the rear cover 115c. The cover 115 is secured to the underside of the tail light housing 110 with screws, not shown, inserted through the two screw through-holes 116 of the mounting rib 115d. The rear winkers or turn signals 37 are respectively attached to the right and left sides of the side-face cover 115a.

The tail light device 90, the cover 115 and a pair of the rear winkers 37 are integrally assembled into a tail light assembly 120. The tail light assembly 120 is secured to the tail light support stay 92 by fixing the tail light device 90 to the tail light mounting member 106. Thus, the tail light support stay 92 is slidably inserted into the angled pipe 93 of the sub frame 91 in order to allow the tail light assembly 120 to move in the vehicle longitudinal direction.

In the tail light device 90 having this structure, as illustrated in FIG. 24 to FIG. 27, by sliding the tail light support stay 92 relative to the angled pipe 93 of the sub frame 91, the tail light assembly 120 can be moved in the vehicle longitudinal direction to a position suitable for the license plate 36. A bolt 117 is inserted through the slotted holes 97 and the fixing holes 107. The bolt 117 thus passing through the angled pipes 93, 105 is fastened with a nut 118 in order to fix a slide position of the tail light support stay 92. Note that, since the upper surface of the angled pipe 93 is covered with the upper-face cover 115b of the cover 115, even if the tail light assembly 120 is moved backward, the angled pipe 93 is not exposed to the outside, thus preventing loss of appearance quality of the vehicle 10.

Figure 24:
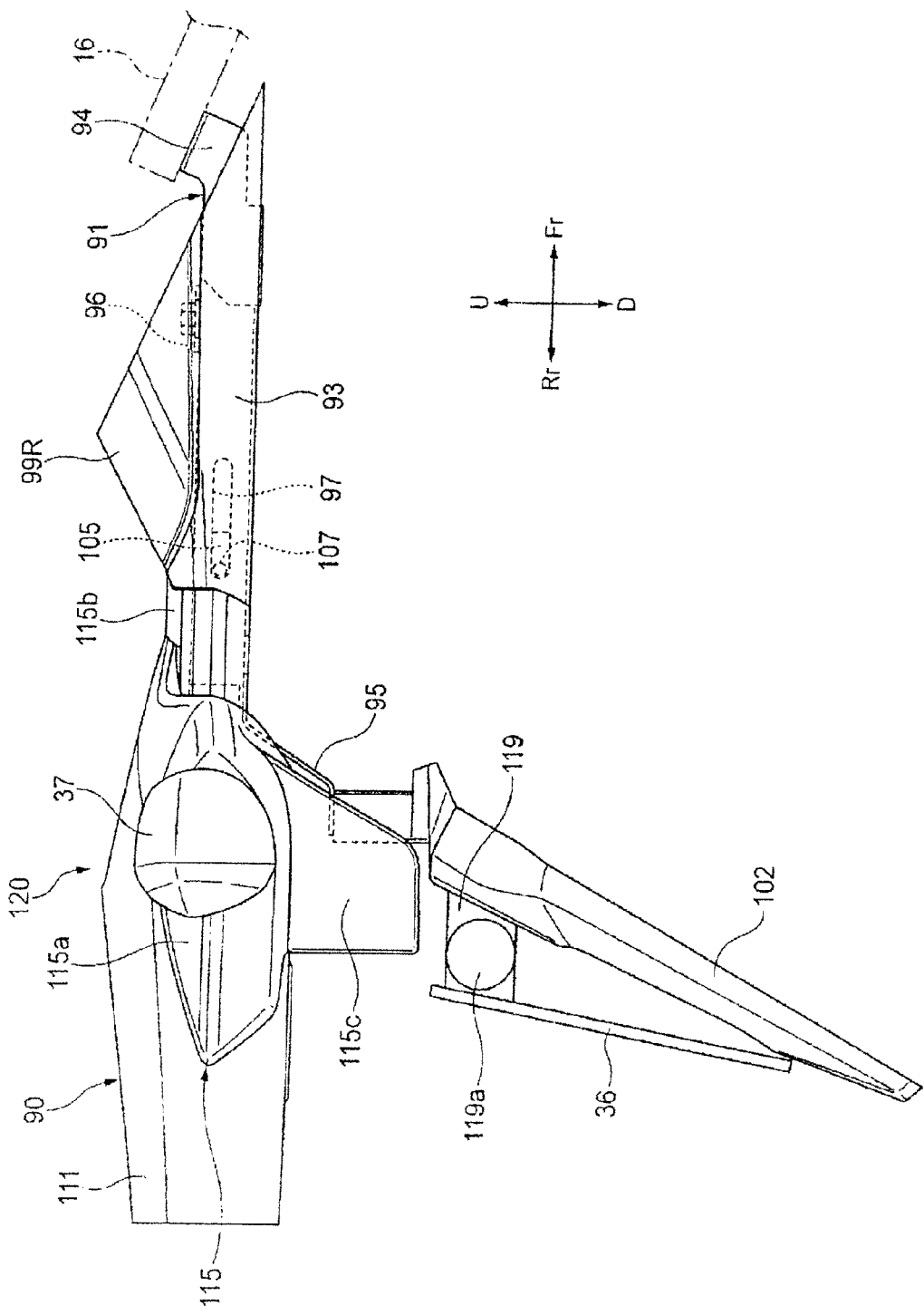
FIG. 24 is a right side view explaining a status where the tail light device is provided in a rear irradiation position.
Figure 25:
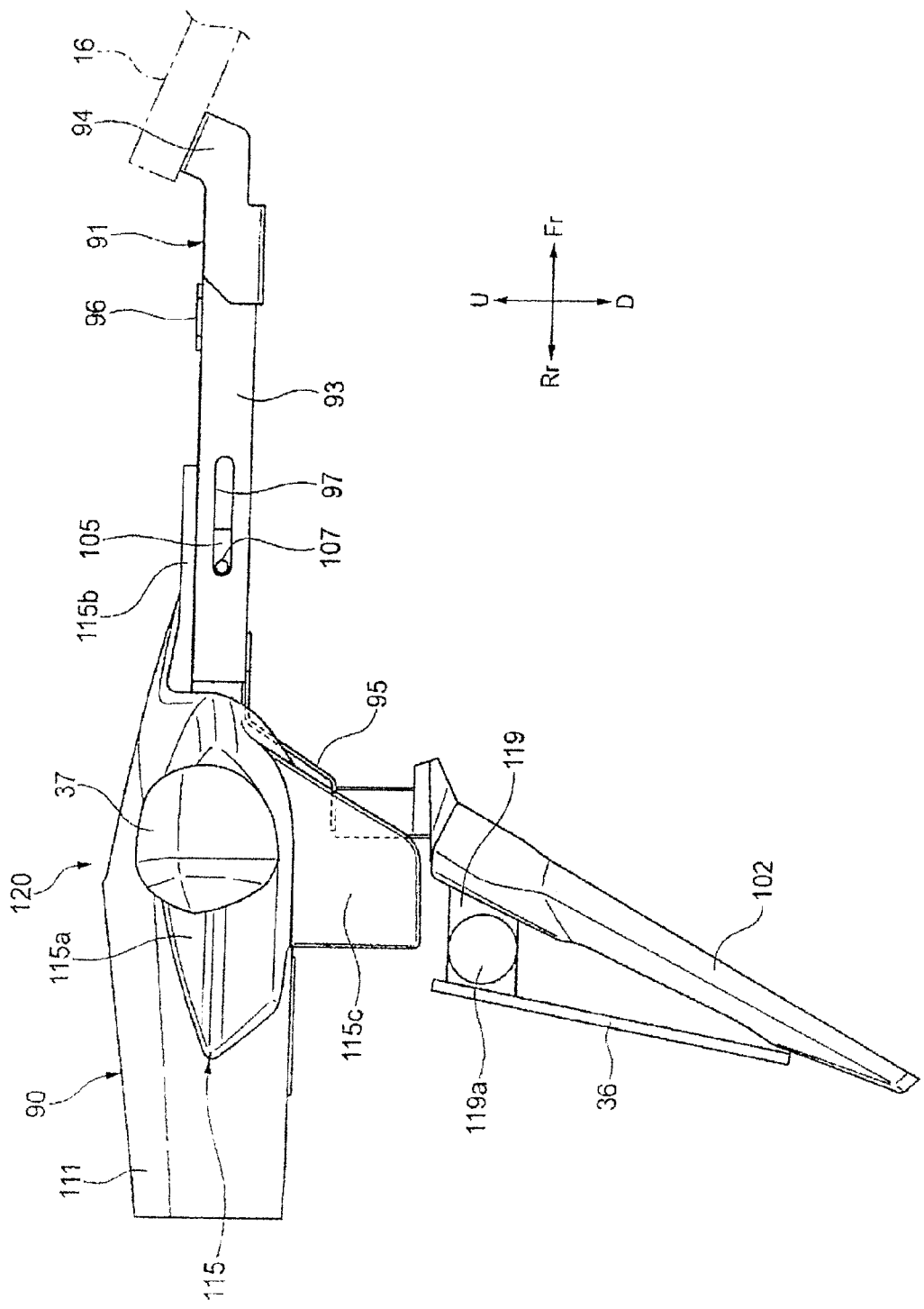
FIG. 25 is a right side view explaining a statue where the rear cover is removed from FIG. 24.

FIG. 24 to FIG. 26 show the tail light device 90 secured to the rear irradiation position, while FIG. 27 shows the tail light device 90 secured to the front irradiation position. As a result, the tail light device 90 is supported through the tail light support stay 92 by the sub frame 91, and is placed above the license plate 36 which is attached to a position which differs in accordance with specification in each country to illuminate the license plate 36 with the bulb light of the tail light bulb 113. Note that, when the tail light device 90 is fixed in the rear irradiation position, a license-plate stay 119 having a reflector 119a provided on its side face is interposed between the rear fender 102 and the license plate 36.

As described above, according to the tail light device 90 in the present embodiment, since the tail light device 90 is supported by the tail light support stay 92 which can move relative to the sub frame 91 in the vehicle longitudinal direction, the tail light device 90 can be secured to an arbitrary position in the vehicle longitudinal direction. Since this makes it possible to adjust a position of the tail light device 90 to meet specifications in each country, the license plate 36 can be effectively illuminated. Further, the tail light device 90 of the embodiment can be fixed to an arbitrary position between the front irradiation position and the rear irradiation position, making it possible to minutely meet specifications in various counties.

Further, according to the tail light device 90 in the present embodiment, the tail light support stay 92 includes the angled pipe 105 which is inserted into the angled pipe 93 of the sub frame 91, and the fixing holes 107 drilled in the angled pipe 105, while the sub frame 91 includes the slotted holes 97 elongated in the vehicle longitudinal direction. Then, the fixing holes 107 are aligned with the slotted holes 97, and the tail light support stay 92 is secured movably relative to the sub frame 91 in the vehicle longitudinal direction. Because of this, the tail light device 90 can be secured in an arbitrary position in the vehicle longitudinal direction. Since this makes it possible to adjust a position of the tail light device 90 to meet specifications in each country, the license plate 36 can be effectively illuminated.

The other structure and advantageous effects are the same as those in the previously discussed embodiments.

The present invention is not limited to the illustrative example described above, and changes may be made as appropriate without departing from the spirit and scope of the invention.

For example, the tail light support stay inserted into the sub frame has been described by way of example, but the present invention is not limited to this. The tail light support stay may be adapted to be fitted over the sub frame.

Further, in this embodiment the sub frame having the slotted holes formed therein and the tail light support stay having the fixing holes formed therein have described by way example, but the present invention is not limited this. The fixing holes may be formed in the sub frame and the slotted holes may be formed in the tail light support stay.

Yet another embodiment of a motorcycle tail light device according to the present invention will be described with reference to FIG. 28 to FIG. 39. Note that the same or similar components/parts as or to those in the previously discussed embodiments are designated the same reference signs in the drawings; descriptions are omitted or simplified.

Figure 28:
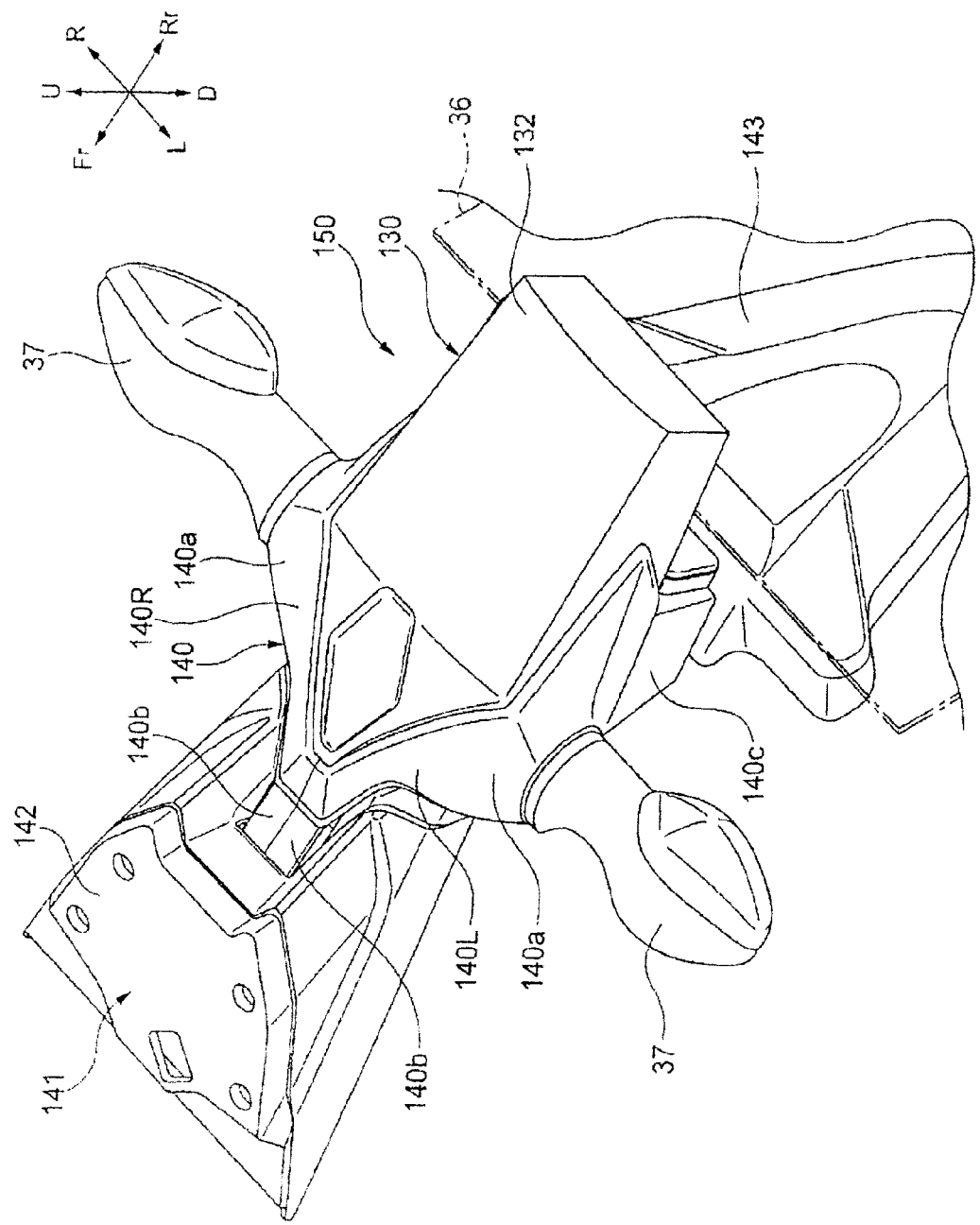
FIG. 28 is a perspective view for explaining a third embodiment of a tail light device according to the present invention.
Figure 29:
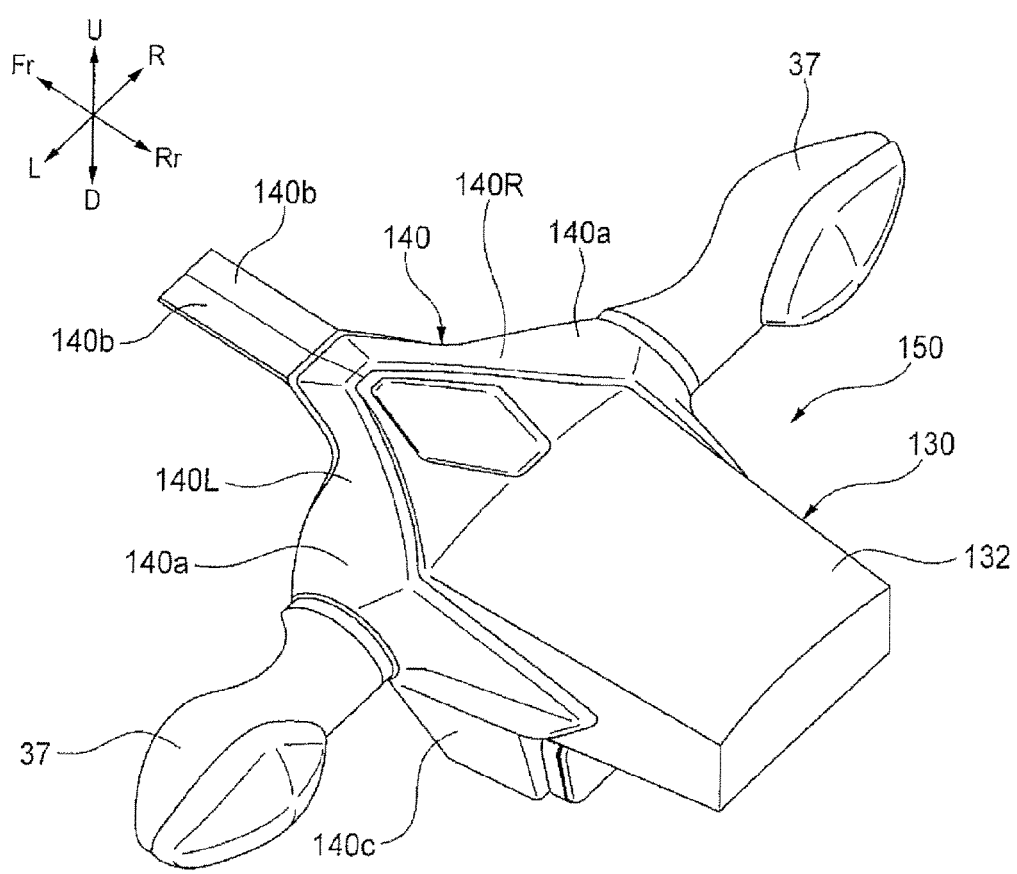
FIG. 29 is a perspective view of a tail light assembly shown in FIG. 28.

In this embodiment, as illustrated in FIG. 28 and FIG. 29, a tail light device 130, a cover 140 which includes right and left covers 140R, 140L covering the tail light device 130, and a pair of the right and left rear winkers 37 which are attached to the right and left covers 140R, 140L are integrally assembled to form a tail light assembly 150. The tail light assembly 150 is mounted movably relative to the rear fender 141 secured to a rear portion of the vehicle body frame 11 in the vehicle longitudinal direction.

Figure 34:
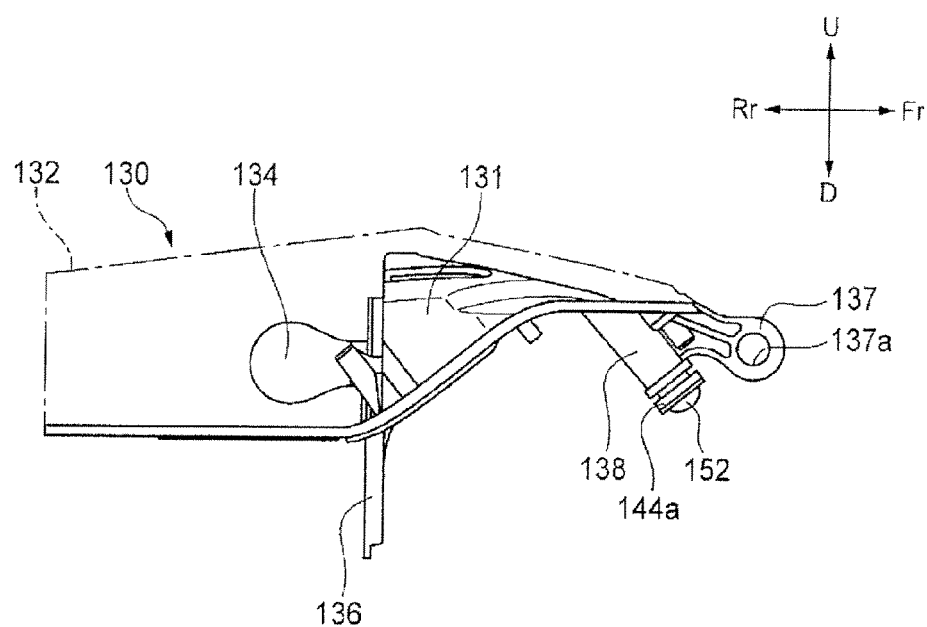
FIG. 34 is a right side view of the tail light device without a tail light lens.
Figure 37:
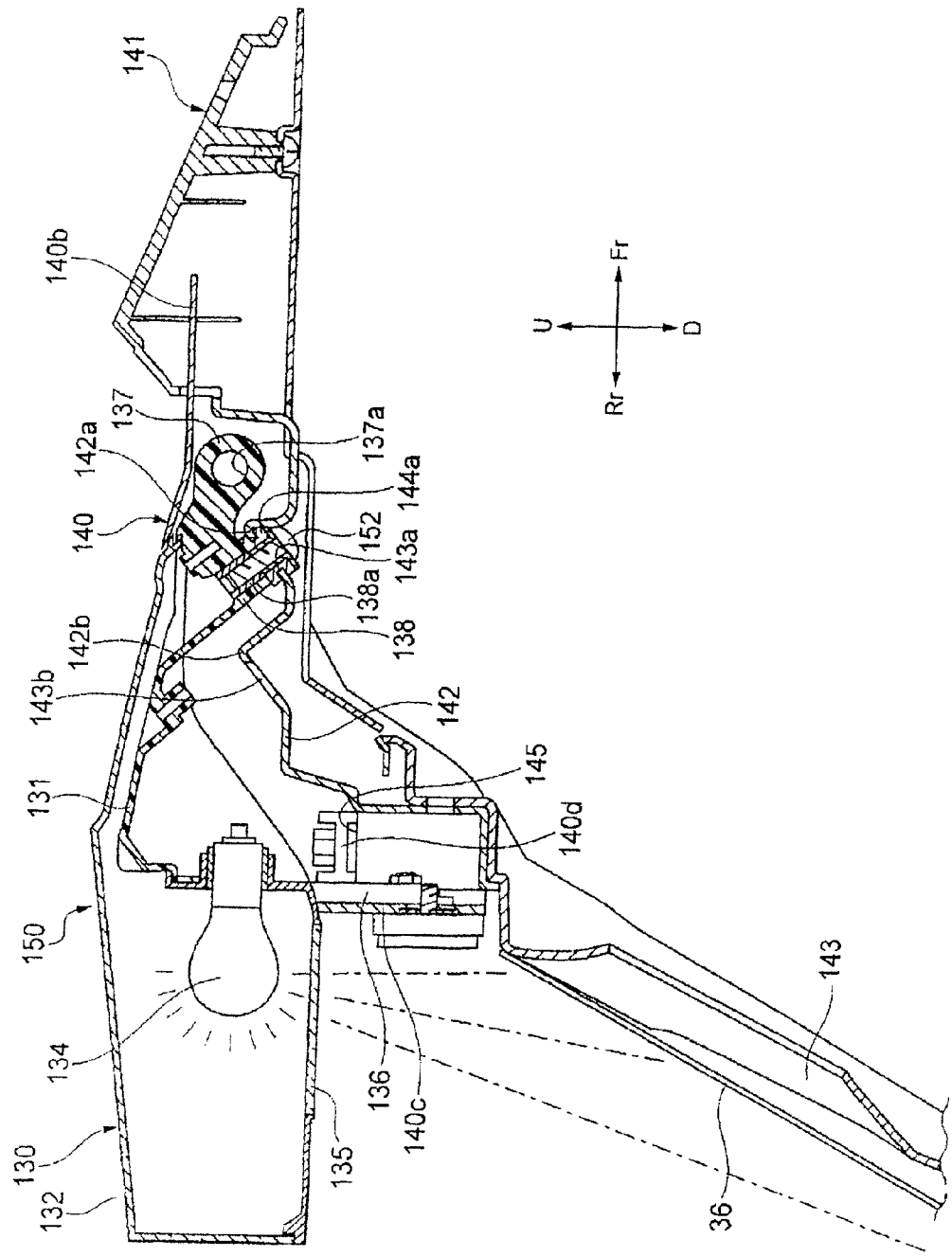
FIG. 37 is a cross-sectional view explaining a status where the tail light device is provided in a front irradiation position.

As illustrated in FIG. 34 and FIG. 37, the tail light device 130 includes a tail light housing 131, a tail light lens 132 covering the entire front upper surface of the tail light housing 131 and closing the entire rear opening of the tail light housing 131, a tail light bulb 134 mounted to the tail light housing 131, and a license plate irradiation lens 135 placed on the rear underside of the tail light housing 131 to guide the bulb light from the tail light bulb 134.

Figure 32:
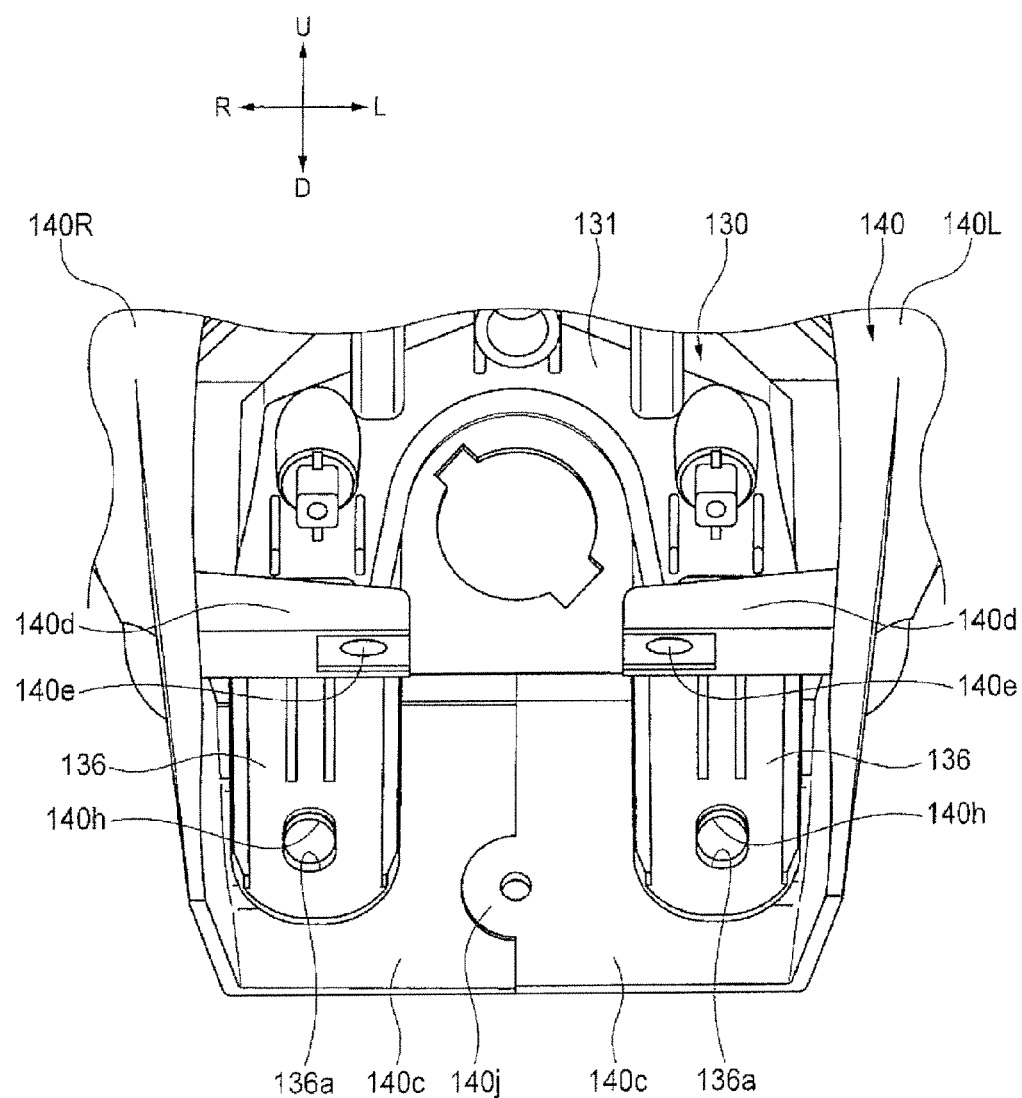
FIG. 32 is a perspective view illustrating an area around a rear cover of the tail light assembly when viewed from the wrong side.
Figure 35:
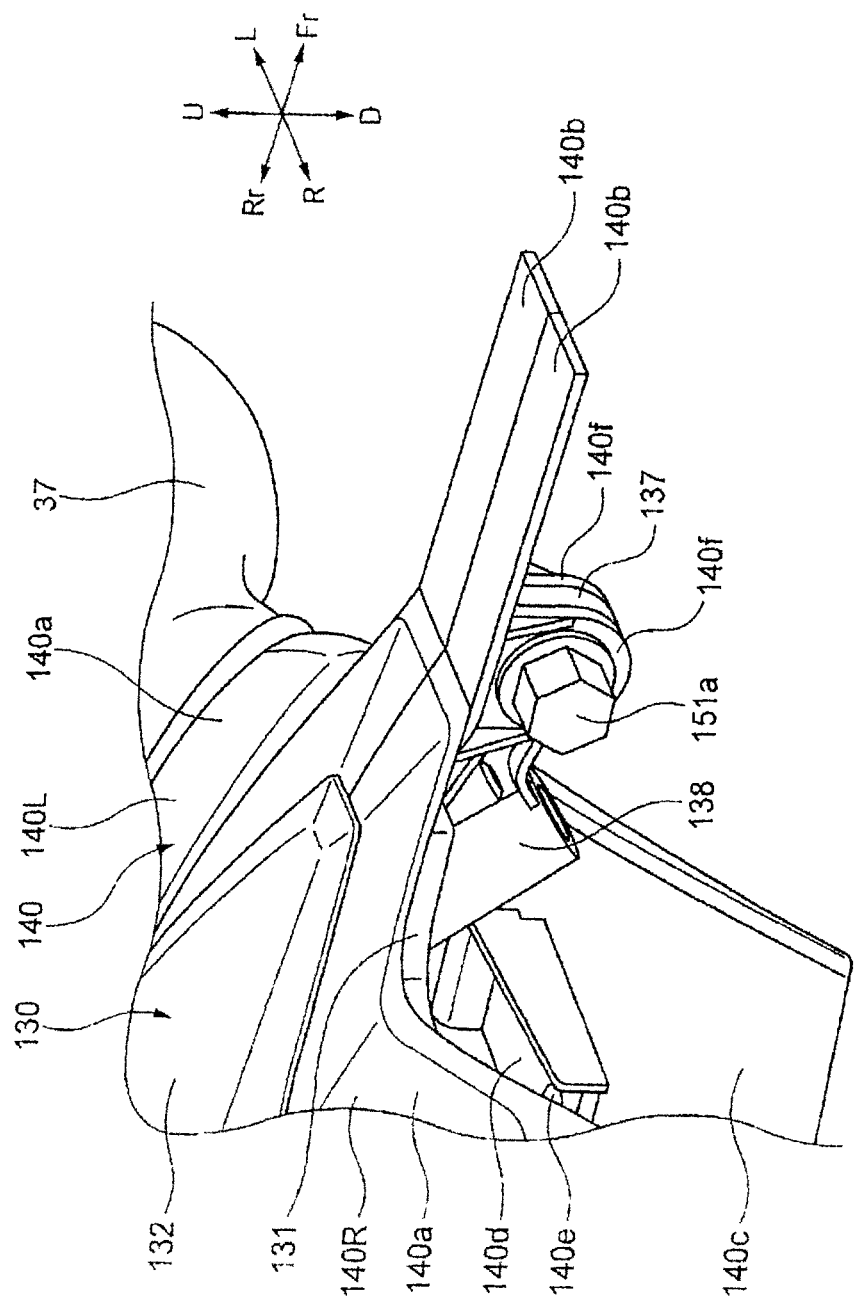
FIG. 35 is a perspective view illustrating an area around a mounting boss of the tail light assembly.
Figure 36:
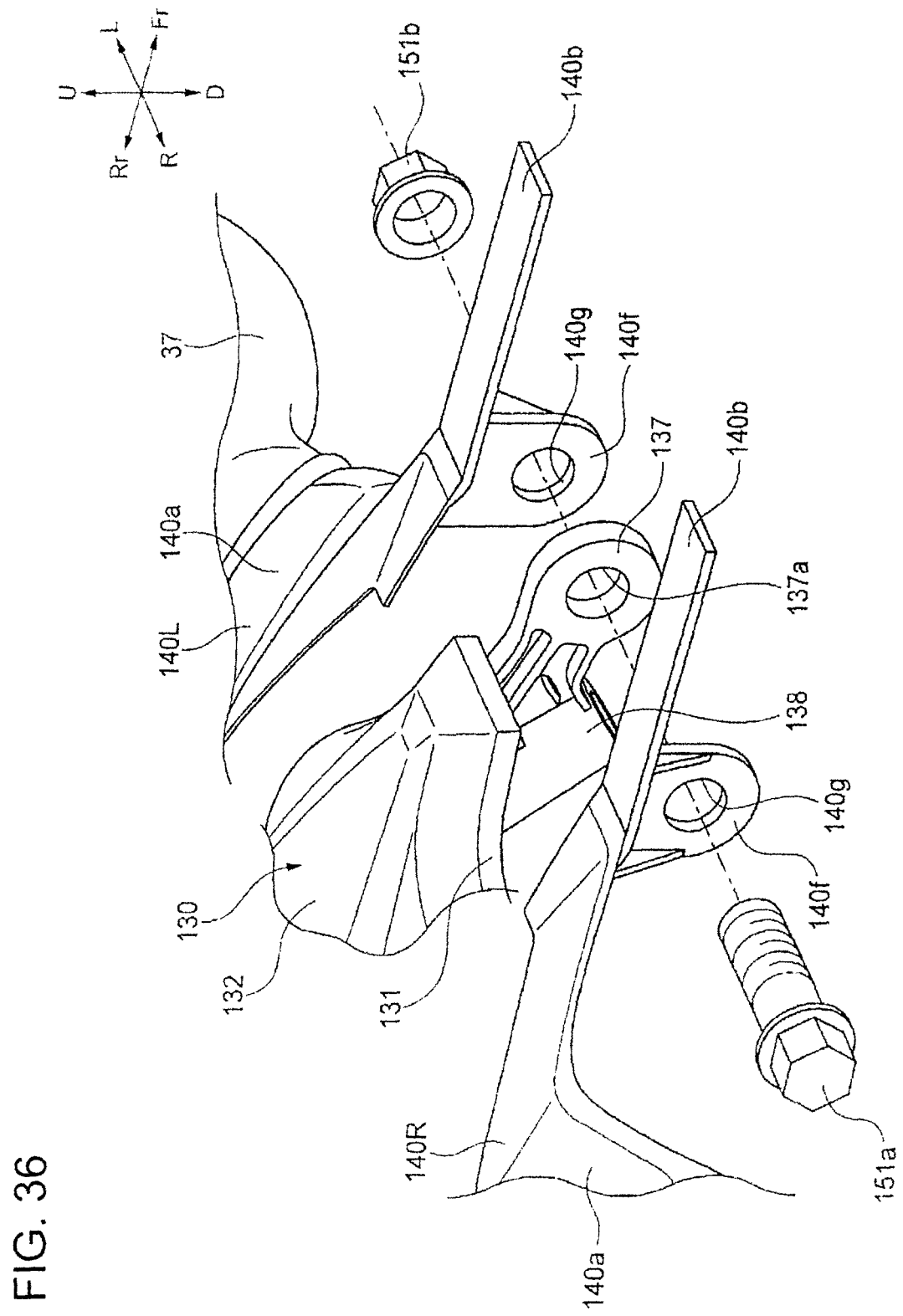
FIG. 36 is an exploded perspective view illustrating an area around the mounting boss of the tail light assembly.

As illustrated in FIG. 32 and FIG. 34, a pair of right and left mounting ribs 136, which have bolt through-holes 136a penetrating in the vehicle longitudinal direction, protrudes downward from the rear underside of the tail light housing 131. As illustrated in FIGS. 34 to 36, a mounting boss 137, which has a bolt through-hole 137a penetrating in the vehicle right-left direction, protrudes forward from the front center of the tail light housing 131.

Figure 31:
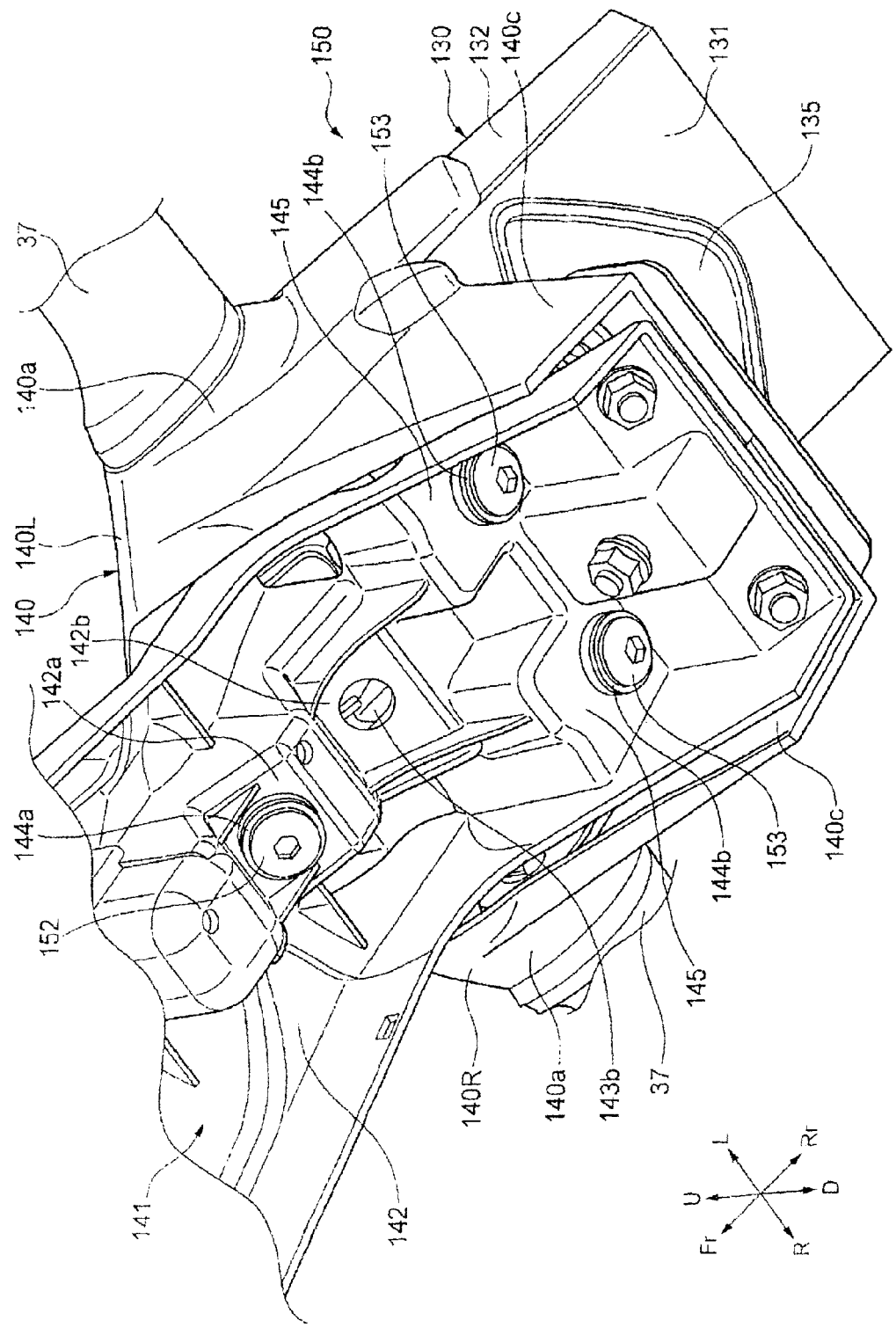
FIG. 31 is a perspective view of the rear fender with the tail light assembly mounted thereon when viewed from diagonally below.
Figure 33:
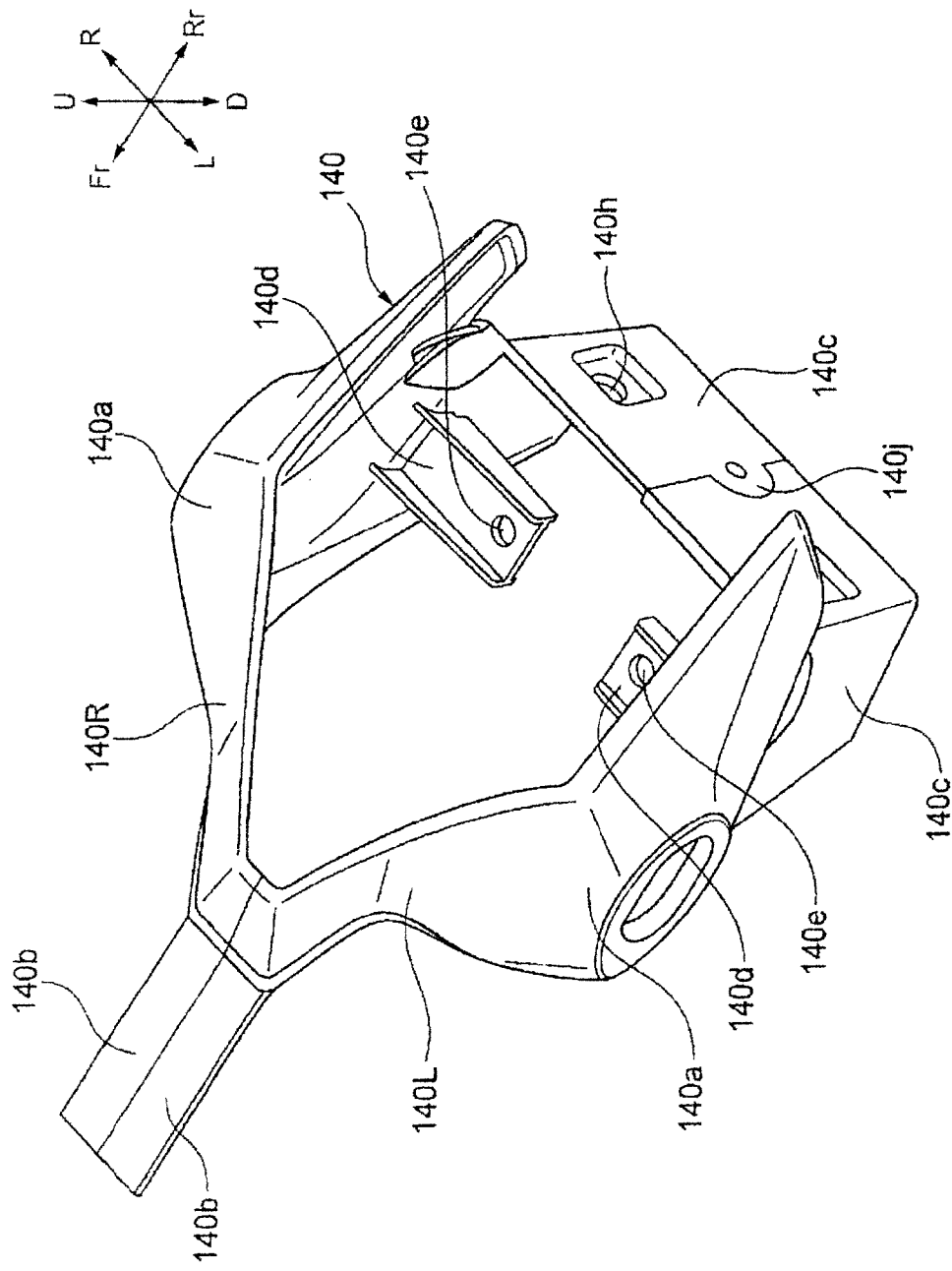
FIG. 33 is a perspective view of the cover of the tail light assembly.

As illustrated in FIGS. 31 to 33, each of the right and left covers 140R, 140L includes a side-face cover 140a which covers an area from a front upper face to a right/left side of the tail light lens 132, a plate-shaped upper-face cover 140b which extends forward from the side-face cover 140a to cover the gap between the tail light lens 132 and the rear fender 141, and a rear cover 140c of approximately L-shaped horizontal section which extends downward from the side-face cover 140a to cover an area under the tail light device 130. In other words, the right and left covers 140R, 140L can be joined together to form an approximately C shape in horizontal section.

Further, as illustrated in FIG. 32 and FIG. 33, a rear mounted member 140d protrudes inward from the inner side face of the side-face cover 140a in order to fix the tail light assembly 150 to the rear fender 141. Each rear mounted member 140d has a bolt through hole 140e penetrating in the vertical direction.

As illustrated in FIG. 35 and FIG. 36, a mounting stay 140f protrudes downward from a portion of the underside of each of the upper-face covers 140b corresponding to the mounting boss 137 and has a bolt through-hole 140g penetrating in the vehicle right-left direction. The right and left mounting stays 140f are arranged with the mounting boss 137 in between and fastened with a bolt 151a inserted through the bolt through-holes 137a, 140g and a nut 151b to be secured to the mounting boss 137. Thus, the front portions of the right and left covers 140R, 140L are secured to the tail light housing 131.

As illustrated in FIG. 32 and FIG. 33, bolt through-holes 140h are respectively drilled through portions of the rear faces of the right and left rear covers 140c corresponding to the mounting ribs 136 in the longitudinal direction. The mounting ribs 136 and the rear covers 140c are fastened with bolts, not shown, inserted through the bolt through-holes 136a, 140h and nuts, so that the rear portions of the right and left covers 140R, 140L are secured to the tail light housing 131.

As illustrated in FIG. 32, FIG. 33, overlapping portions 140j are respectively formed in the joint edges of the rear faces of the right and left rear covers 140c. The overlapping portions 140J are fastened with screws not shown in the vehicle longitudinal direction, thus coupling the right and left rear covers 140c to each other.

Figure 30:
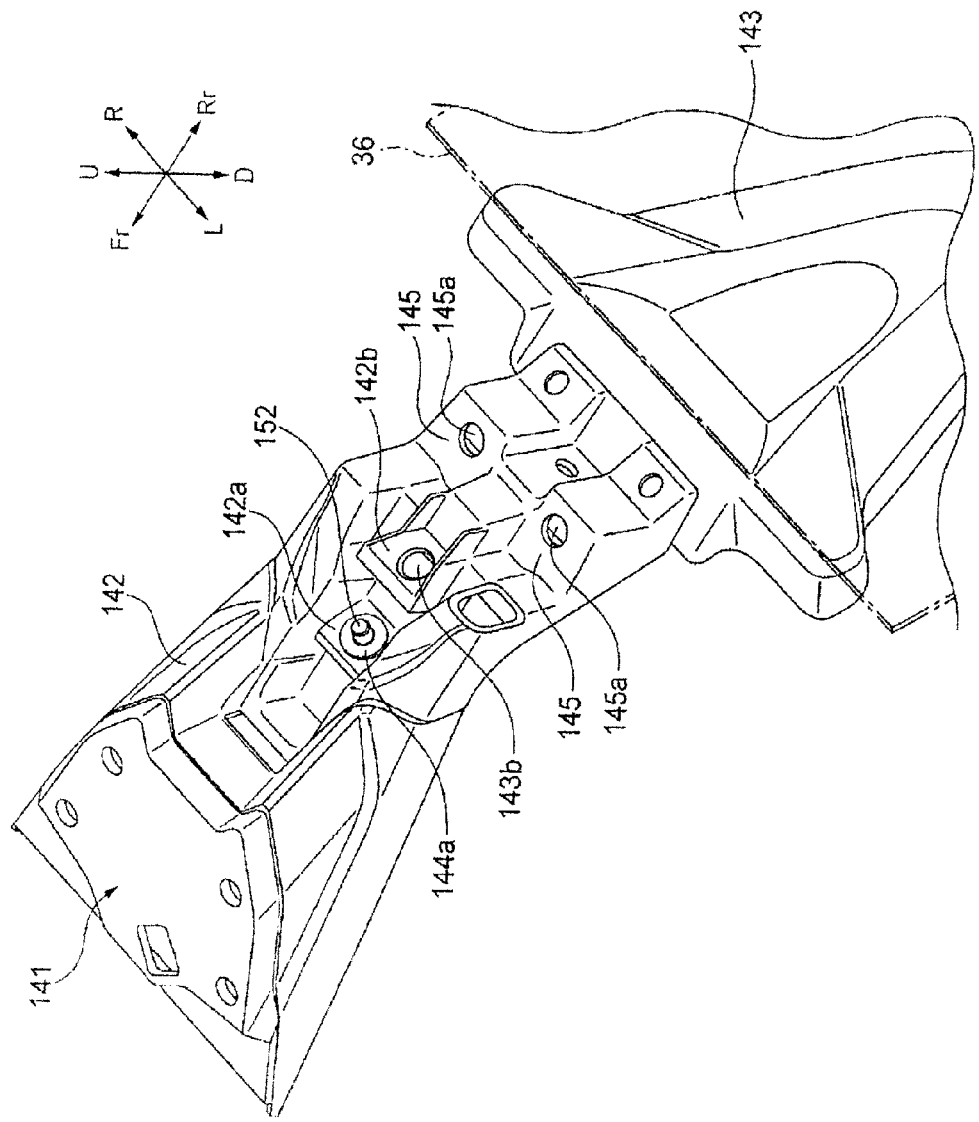
FIG. 30 is a perspective view of a rear fender shown in FIG. 28.

As illustrated in FIG. 30, FIG. 31 and FIG. 37, the rear fender 141 can include an upper rear fender 142 and a lower rear fender 143 fixed integrally with a lower end of the upper rear fender 142, and secured to the rear end of the rear frame 16. A first front mounting face 142a which is a first front mounting member and a second front mounting face 142b which is a second front mounting member are provided in the center of the upper rear fender 142 in the vehicle right-left direction and separated from each other in the vehicle longitudinal direction, the first front mounting face 142a and the second front mounting face 142b slanting gradually downward from the front of the vehicle toward the rear. Further the first front mounting face 142a has a bolt through-hole 143a formed therein, and the second front mounting face 142b has a bolt through-hole 143b formed therein. A grommet 144a is placed on at least one of the bolt through-holes 143a, 143b; for illustration purposes, placed on only the bolt through-hole 143a in FIG. 30.

Further, as illustrated in FIG. 30 and FIG. 31, rear mounting faces 145, which are rear mounting members, are arranged in the vehicle right-left direction, and located on a lower level than positions of the first and second front mounting faces 142a, 142b toward the rear of the vehicle with respect to the second front mounting face 142b of the upper rear fender 142. A pair of right and left rear mounting faces 145 respectively have bolt through-holes 145a penetrating in the vehicle vertical direction. Grommets 144b are respectively placed on the bolt through-holes 145a.

Further, as illustrated in FIGS. 34 to 37, a tubular front mounted member 138 is provided on the underside of the front end of the tail light housing 131. An insert nut 138a is fixed inside the front mounted member 138. When the tail light assembly 150 is mounted on the rear fender 141, the front mounted member 138 is attached to either the first front mounting face 142a or the second front mounting face 142a.

Further, in the embodiment, for placing the tail light device 130 in a rear irradiation position, an extension stay 146 is used to couple the pair of right and left rear mounting faces 145 of the upper rear fender 142 to the pair of right and left rear mounted member 140d of the cover 140 which will be located more backward than the position of the pair of right and left rear mounting faces 145.

Figure 39:
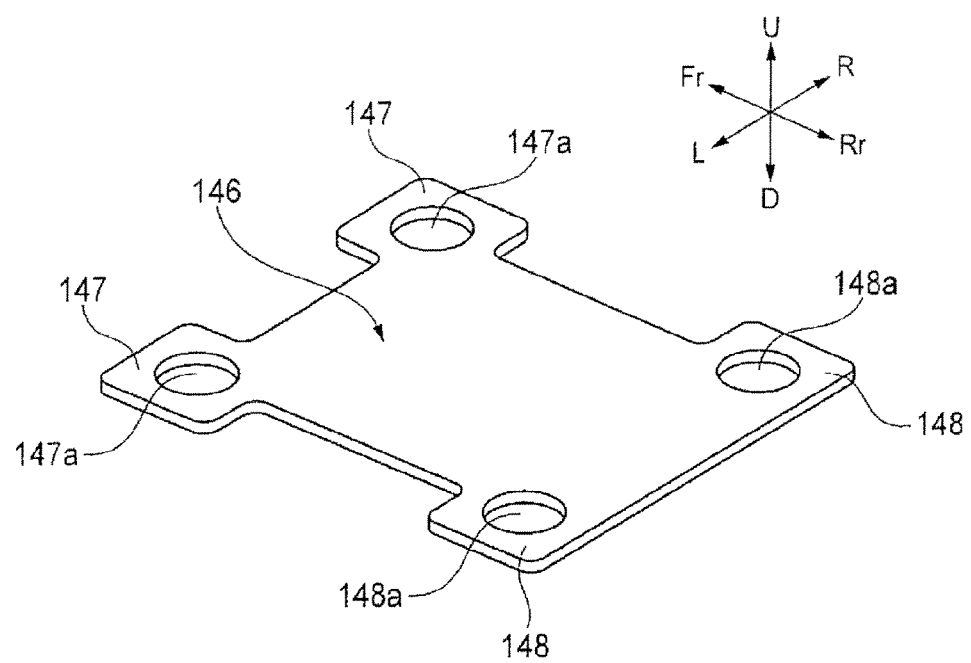
FIG. 39 is a perspective view of an extension stay.

The extension stay 146 can be a metallic plate-shaped member. As shown in FIG. 39, the right and left ends of the front end of the extension stay 146 respectively overlap a pair of the right and left rear mounting faces 145 of the upper rear fender 142, to form a pair of right and left front stay mounting members 147 having screw holes 147a penetrating in the vehicle vertical direction. Also, the right and left ends of the rear end of the extension stay 146 respectively overlap a pair of the right and left rear mounted members 140d of the cover 140, to form a pair of right and left rear stay mounting members 148 having bolt through-holes 148a penetrating in the vehicle vertical direction. The distance between the pair of right and left front stay mounting members 147 and the pair of right and left rear stay mounting members 148 is set to be equal to the distance between the first front mounting face 142a and the second front mounting face 142b.

In the tail light device 130 thus structured, as illustrated in FIG. 31 and FIG. 37, the front mounted member 138 of the tail light housing 131 is placed on the first front mounting face 142a of the upper rear fender 142, and the front mounted member 138 is fastened to the first front mounting face 142a with the bolt 152. Also, a pair of the rear mounted members 140d of the cover 140 are respectively placed on a pair of the right and left rear mounting faces 145 of the upper rear fender 142, and a pair of the right and left rear mounted members 140d are fastened to a pair of the right and left rear mounting faces 145 with the bolts 153. In consequence, the tail light device 130 is disposed in the front irradiation position.

Figure 38:
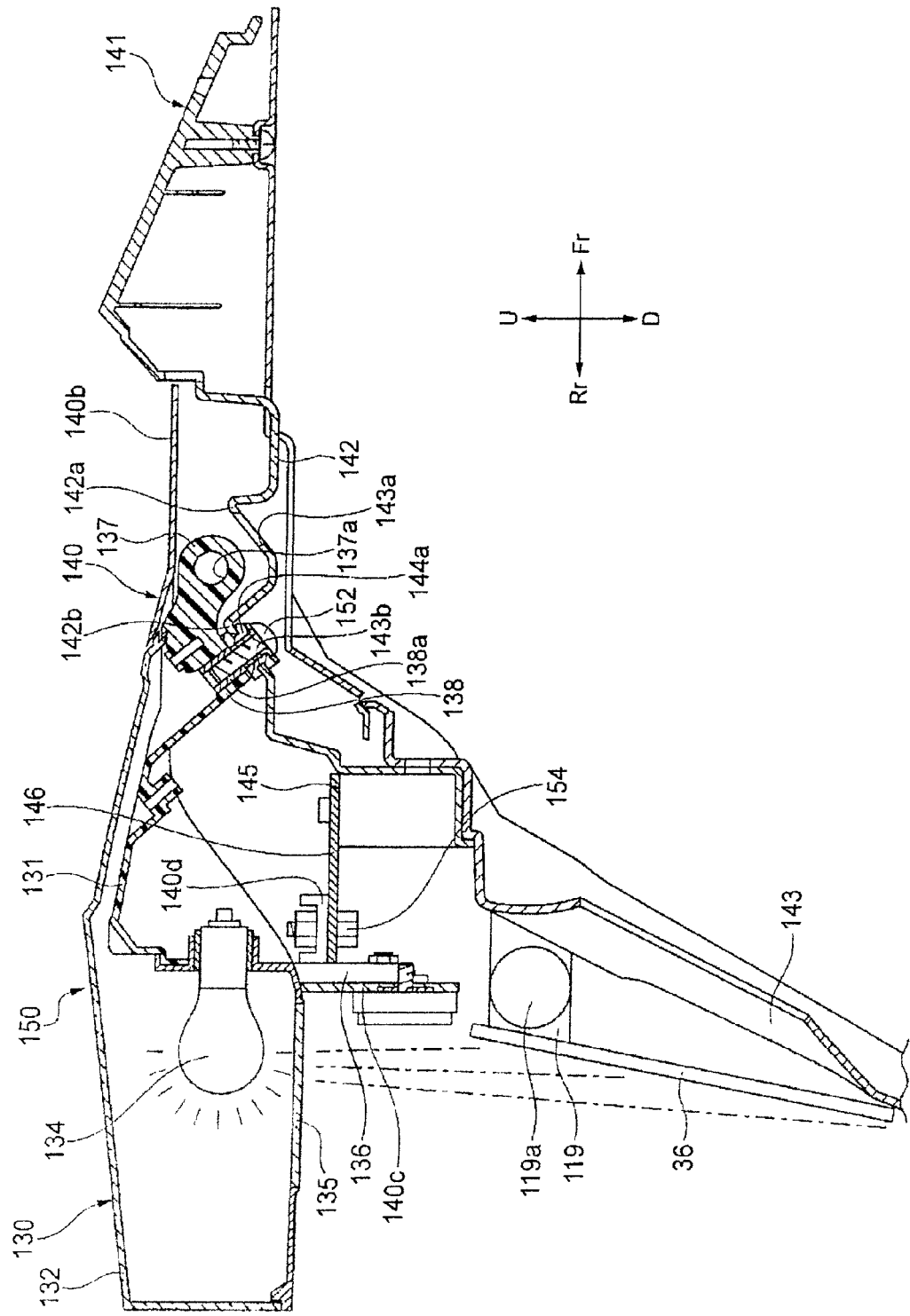
FIG. 38 is a cross-sectional view explaining a status where the tail light device is provided in a rear irradiation position.

Further, as illustrated in FIG. 38, the front mounted member 138 of the tail light housing 131 is placed on the second front mounting face 142b of the upper rear fender 142, and the front mounted member 138 is fastened to the second front mounting face 142b with the bolt 152. Also, a pair of the right and left stay mounting members 146a of the extension stay 146, which are fastened to a pair of the right and left rear mounted members 140d of the cover 140 with the bolts 154, are respectively disposed on a pair of the right and left rear mounting faces 145 of the upper rear fender 142, and a pair of the right and left stay mounting members 146a are fastened to a pair of the right and left rear mounting faces 145 with the bolts 153. In consequence, the tail light device 130 is disposed in the rear irradiation position.

As described above, according to the tail light device 130 of the embodiment, the rear fender 141 includes the first and second front mounting faces 142a, 142b which are located at a distance from each other in the vehicle longitudinal direction, and a pair of the right and left rear mounting faces 145 which are arranged side by side in the vehicle right-left direction in a position closer to the rear of the vehicle than the position of the second front mounting face 142b. The tail light device 130 includes the front mounted member 138 which is attached to either the first or the second front mounting face 142a, 142b. The cover 140 integrally secured to the tail light device 130 includes a pair of the right and left rear mounted members 140d which are attached directly or through the extension stay 146 to a pair of the right and left rear mounting faces 145. The front mounted member 138 is attached to the first front mounting face 142a, and also a pair of the right and left rear mounted members 140d are attached directly to a pair of the right and left rear mounting faces 145, or alternatively, the front mounted member 138 is attached to the second front mounting face 142b, and also a pair of the right and left rear mounted members 140d are attached through the extension stay 146 to a pair of the right and left rear mounting faces 145. Because of this, the tail light device 130 can be mounted while being moved in the vehicle longitudinal direction. In consequence, since the position of the tail light device 130 can be changed in accordance with specifications in each country, the license plate 36 can be illuminated with reliably.

The other structure and advantageous effects are the same as those in the previously discussed embodiments.

REFERENCE SIGNS LIST

10 . . . motorcycle
16 . . . rear frame (vehicle body frame)
36 . . . license plate
37 . . . rear winker
50 . . . tail light device
51 . . . tail light housing
52 . . . tail light lens
53 . . . reflector
54 . . . tail light bulb
56 . . . license plate irradiation opening
57 . . . license plate irradiation lens
60 . . . tail light support stay
61 . . . front stay
62 . . . rear stay
63 . . . cover
71 . . . front first engagement concave member (front engagement member)
72 . . . front second engagement concave member (front engagement member)
73 . . . rear first engagement concave member (rear engagement member)
74 . . . rear second engagement concave member (rear engagement member)

75 . . . front engagement convex member (front engaged member)
76 . . . rear engagement convex member (rear engaged member)
77 . . . pin
78 . . . elastic body
81 . . . Front engagement hole, front engagement pin (Engaged member)
82 . . . Rear engagement hole, rear engagement pin (Engaged member)
83 . . . Front engagement pin, front engagement hole (Engagement member)
84 . . . Common engagement pin, common engagement hole (Engagement member)
85 . . . Rear engagement pin, rear engagement hole (Engagement member)
90 . . . Tail light device
91 . . . Sub frame (vehicle body frame)
92 . . . Tail light support stay
93 . . . Angled pipe
97 . . . Slotted hole
105 . . . Angled pipe (fit member)
106 . . . Tail light mounting member
107 . . . Fixing hole
113 . . . Tail light bulb
120 . . . Tail light assembly
130 . . . Tail light device
134 . . . Tail light bulb
138 . . . Front mounted member
140 . . . Cover
140d . . . Rear mounted member
141 . . . Rear fender
142 . . . Upper rear fender
142a . . . First front mounting face (first front mounting member)
142b . . . Second front mounting face (second front mounting member)
145 . . . Rear mounting face (rear mounting member)
146 . . . Extension stay
150 . . . Tail light assembly

We claim:

1. A motorcycle tail light device, comprising:
a tail light support stay configured to support the device to a vehicle frame;
a plurality of front engagement members, provided in a front part of the tail light support stay, configured to enable movement of a support position of the tail light device with respect to a license plate in a vehicle longitudinal direction;
a plurality of rear engagement members, provided in a rear part of the tail light support stay, configured to enable movement of the support position of the tail light device with respect to the license plate in the vehicle longitudinal direction;
a front engaged member, provided in a front part of the tail light device, configured to be engaged with any one of the plurality of front engagement members; and
a rear engaged member, provided in a rear part of the tail light device, configured to be engaged with any one of the plurality of rear engagement members.

2. The motorcycle tail light device according to claim 1, wherein the front engagement members and the rear engagement members comprise one of concave members and convex members, and the front engaged member and the rear engaged member comprise the other one of concave members and convex members concave-convex engaged with the one of concave members and convex members.

3. The motorcycle tail light device according to claim 2, wherein the convex members have pins and elastic bodies provided between the pins and the concave members.

4. The motorcycle tail light device according to claim 1, wherein the front engagement members and the rear engagement members comprise concave members, and the front engaged member and the rear engaged member are convex members configured to be concave-convex engaged with the concave members.

5. The motorcycle tail light device according to claim 1, wherein the front engagement members are provided in two positions in the front part of the tail light support stay, and the rear engagement members are provided in two positions shifted in the rear of the front engagement members.

6. The motorcycle tail light device according to claim 1, wherein the front engagement members are provided in two positions in an upper part of the tail light support stay, and the rear engagement members are provided in two positions at heights shifted below the front engagement members.

7. The motorcycle tail light device according to claim 1, wherein the tail light support stay comprises a pair of left and right stays,
and wherein the tail light device (50) is held between the pair of left and right tail light support stays.

8. The motorcycle tail light device according to claim 1, wherein the tail light support stay is provided to overlap the tail light device in a top view.

9. The motorcycle tail light device according to claim 1, wherein the tail light support stay has a front stay attached to the vehicle frame and a rear stay where the tail light device is attached,
and wherein the front stay and the rear stay are integrally formed.

10. The motorcycle tail light device according to claim 1, wherein the tail light support stay has a front stay attached to the vehicle frame and a rear stay where the tail light device (50) is attached,
and wherein the front stay and the rear stay are separately formed, and the front stay and the rear stay are mutually connected.

11. The motorcycle tail light device according to claim 1, wherein a rear winker or turn signal is attached to the tail light support stay.

12. The motorcycle tail light device according to claim 1, wherein the tail light support stay comprises resin or light weight alloy.

13. A motorcycle tail light device (50), comprising:
a tail light support stay or a rear fender (33) for supporting the device to a vehicle frame;
at least three engagement members, provided in the tail light support stay or the rear fender, configured to enable movement of a support position of the tail light device with respect to a license plate in a vehicle longitudinal direction; and
engaged members, provided in the tail light device, that are engaged with any of the at least three engagement members.

14. A motorcycle tail light device, wherein the tail light device is supported with a tail light support stay that is provided movably relative to a vehicle frame of the motorcycle in a vehicle longitudinal direction.

15. The motorcycle tail light device according to claim 14, wherein the tail light support stay comprises a fit member fitted with the vehicle frame, and one of a fixing hole provided in the fit member and a slotted hole elongated in the vehicle longitudinal direction, wherein the vehicle frame has the other of the fixing hole and the slotted hole elongated in the vehicle longitudinal direction, and wherein the fit member is fitted with the vehicle frame, the fixing hole is aligned with the slotted hole, and the tail light support stay is fixed movably relative to the vehicle frame in the vehicle longitudinal direction.

16. A motorcycle tail light device, wherein the tail light device is supported with a rear fender fixed to a vehicle frame (11), said device comprising:

a first front mounting member and a second front mounting member provided at a distance from each other in a vehicle longitudinal direction in a center of the rear fender in a vehicle right-left direction;

a pair of rear mounting members provided side by side in the vehicle right-left direction in the rear fender in a position closer to the rear of the vehicle than the second front mounting member is located;

a front mounted member provided in a front portion of the tail light device and mounted on either the first front mounting member or the second front mounting member;

a pair of rear mounted members provided in a rear portion of the tail light device and mounted to the pair of rear mounting members; and an extension stay fixed to the pair of rear mounting members for changing a coupling position of the pair of rear mounted members toward the rear of the vehicle, wherein, when the front mounted member is mounted to the second front mounting member, the pair of rear mounted members are attached to the pair of rear mounting members through the extension stay.

17. A motorcycle tail light device, comprising:

a tail light support means for supporting the tail light device to a vehicle frame;

a front engagement means for engaging the tail light support means, and for enabling movement of a support position of the tail light device with respect to a license plate in a vehicle longitudinal directions, a rear engagement means engaging a rear part of the tail light support means, said rear engagement means for enabling movement of the support position of the tail light device with respect to the license plate in the vehicle longitudinal directions;

front engaged means for engaging with the front engagement means, said front engaged means disposed in a front part of the tail light device; and rear engaged means for engaging the rear engagement means, said rear engaged means disposed in a rear part of the tail light device.

18. The motorcycle tail light device according to claim 17, wherein the front engagement means and the rear engagement means comprise one of concave members and convex members, and wherein the front engaged means and the rear engaged means comprise the other of concave members and convex members, wherein said concave members and convex members are concaved, convexed, engaged with each other.

* * * * *